(12) United States Patent
Gucyski

(10) Patent No.: US 6,362,979 B1
(45) Date of Patent: Mar. 26, 2002

(54) SWITCHING POWER AMPLIFIER AND UNINTERRUPTIBLE POWER SYSTEM COMPRISING DC/DC CONVERTER FOR PROVIDING SINUSOIDAL OUTPUT

(76) Inventor: Jeff Gucyski, P.O. Box 11633, Costa Mesa, CA (US) 92627

( * ) Notice: Subject to any disclaimer, the term of this patent is extended or adjusted under 35 U.S.C. 154(b) by 0 days.

(21) Appl. No.: 09/672,986

(22) Filed: Sep. 29, 2000

(51) Int. Cl.⁷ .............................................. H02M 3/335

(52) U.S. Cl. .................. 363/17; 363/21.14; 363/21.08; 363/21.06

(58) Field of Search ................................ 363/21.14, 17, 363/131, 21.08, 21.06

(56) References Cited

U.S. PATENT DOCUMENTS 4,189,764 A * 2/1980 Snyder ........................ 363/37

* cited by examiner

Primary Examiner—Shawn Riley

(57) ABSTRACT

Switching power amplifier and uninterruptible power system each can be built using only 6 power components, including battery and output capacitor. Moreover, line isolation is accomplished. An inductive block includes an inductor and/or a transformer, and provides a return voltage. A first switch selectively applies at least one supply voltage to the inductive block. A first rectifier limits the return voltage, e.g. to the battery voltage. Another capacitor stores a DC voltage and the series-coupled output capacitor provides the output voltage. A sum of the capacitor voltages is positive even at negative peak of the output voltage. A second switch and a second rectifier apply the sum to the inductive block. The output voltage and a current charging the battery can be pure sinusoidal.

20 Claims, 11 Drawing Sheets

SWITCHING POWER AMPLIFIER AND UNINTERRUPTIBLE POWER SYSTEM COMPRISING DC/DC CONVERTER FOR PROVIDING SINUSOIDAL OUTPUT

CROSS REFERENCE TO RELATED INVENTIONS

The present invention is related by subject matter to co-pending applications filed on even date herewith and hereby incorporated by reference: "Precision Switching Power Amplifier and Uninterruptible Power System," Ser. No. 676,792" and "Switching Power Supplies Incorporating Power Factor Correction and/or Switching at Resonant Transition," Ser. No. 676,793. The present invention is also related to the following U.S. Patents by the same inventor, U.S. Pat. Nos.:

6,121,756 (et al.), 6,011,702, 5,896,280 (et al.), 5,892,666, 5,736,841, 5,637,988, 5,426,413, 5,382,843, 5,270,904, 5,267,132, 5,252,974, 5,225,767, 5,221,887, 5,214,430, 5,206,649, 5,196,995, 5,173,698, 5,164,657, 5,164,656, 5,155,489, 5,155,430, 5,155,381, 5,146,399, 5,099,241, 5,057,990, 5,041,832, 4,999,568, 4,980,686, 4,980,649, 4,958,155, 4,956,760, 4,949,234, 4,947,308, 4,943,740, 4,940,982, 4,940,906, 4,929,848, 4,871,980, 4,866,398, 4,857,931, 4,853,837, 4,845,391, 4,843,392, 4,837,572, 4,829,263, 4,811,017, 4,803,610, 4,782,306, 4,763,106, 4,763,080, 4,749,958, 4,749,953, 4,736,286, 4,714,894, 4,634,996 and 4,476,441.

FIELD OF THE INVENTION

The invention relates to unidirectional AC/AC and DC/AC converters and a bi-directional DC/AC converter. This includes switching power amplifier, AC power source, frequency converter, line conditioner and uninterruptible power source.

BACKGROUND OF THE INVENTION

Many terms exist to describe various types of devices used for power conversion. The following definitions are provided in order to avoid any conflict of terms. A switching power supply (SPS) is an AC/DC or DC/DC converter. A switching power amplifier (SPA) is an AC/AC or DC/AC converter. An SPA that produces a fixed frequency is commonly referred to as inverter, AC voltage regulator, AC power source, line conditioner, frequency converter, etc. An SPA that amplifies a variable frequency is often narrowed to class-D amplifier, whereas other techniques exist. An uninterruptible power source/supply/system (UPS) is a bi-directional DC/AC converter in which energy is delivered from a rechargeable battery to an output, and vice versa. The UPS charges the battery when line is present and simulates line voltage when line fails. However, a low-cost UPS usually produces a square wave voltage that has adequate RMS level. In the following disclosure, the term converter refers to a block performing an essential function within a parent apparatus.

Conventional SPA and UPS each comprise an output inductor coupled in series with an output capacitor. A positive supply voltage selectively applied to the inductor is greater than positive peak of the output voltage. Similarly, a negative supply voltage is smaller than negative peak of the output voltage. In the SPA, a pair of ungrounded switches drives the inductor. One switch is referenced to the negative supply voltage, whereas the other switch is floating. In the UPS, a DC/DC converter and a battery charger are added to the SPA. A single battery voltage is converted into the supply voltages of the SPA. If a transformer is used but line isolation is unnecessary, one of the output switches is grounded. The other switch remains floating. During the battery charging, the switches used in the DC/DC converter and the SPA are idle. The battery charger employs an additional switch that is used exclusively for charging. An ordinary battery is tolerant of charging current waveform. Therefore, low cost of the charger is the primary concern. The charger acts like an SPS. Conventional SPSs commonly use power factor correction to produce a sinusoidal input current. By contrast, a sinusoidal current for charging the battery is unheard-of in low-cost UPSs.

SUMMARY OF THE INVENTION

The present invention is intended to provide low-cost SPA and UPS with sinusoidal output. For example, the SPA or UPS can be built using only six power components. These include a battery, a pair of MOSFETs with on-chip diodes and a capacitor providing the output voltage. Moreover, line isolation is accomplished. Therefore, a procedure of replacing the battery is safe and isolated from electrical hazards. The UPS requires a relay and a diode bridge to produce a pure sinusoidal current for charging the battery. This double-pole double-throw relay incorporates a transfer switch.

The SPA and UPS are intended to provide an AC output voltage in response to a reference voltage. However, it is necessary that an output current have a negligible DC offset. Accordingly, the load is preferably symmetrical, i.e. capable of drawing the same current independently of polarity. One exemplary application is a UPS driving a typical SPS. The SPS presents a load that is equivalent to a diode bridge driving a large capacitor and a parallel-coupled resistor. If the SPS is power factor corrected, the load is equivalent to a diode bridge driving a resistor. In either case, if one of the diodes in the bridge fails to conduct, the SPS continues to operate properly. However, this puts disproportionate stress on undamaged conducting diodes, protection devices, the capacitor, switches, etc. The SPS can malfunction and eventually fail completely. The UPS immediately detects this partial failure and prevents further destruction of the SPS. Another exemplary application is an audio SPA. An audio signal lacks any DC offset. Moreover, a loudspeaker represents a nonlinear load that may strongly depend on amplitude and frequency of the amplified audio signal, but remains symmetrical. An audio signal with DC offset or an asymmetric loudspeaker load indicates abnormal and possibly destructive condition. It should result in immediate shutdown of the SPA.

An asymmetric operation is acceptable, however. A first capacitor stores a DC voltage. A second series-coupled capacitor provides the output voltage. In order to maintain the DC voltage within a predetermined range, an average value of the output current must be zero. Accordingly, a current charging the first capacitor must be equal to the current discharging it. This is inherent if the output voltage lacks DC offset and the load is symmetric. Otherwise, an adequate DC offset has to be added to the output current in order to adjust its average value to zero. This can be accomplished in various ways since waveform of the output voltage is insignificant from the viewpoint of the circuit operation. For example, the output voltage can be clipped, amplified at polarity dependent gain or shifted by an adequate DC offset.

An example of an asymmetric load is a resistor in parallel with an equal resistor that is in series with a diode. The diode is cut off when the output voltage has one polarity. Otherwise, the diode conducts causing both resistors to evenly share the output current. The output voltage has to be effectively cut in half at latter polarity so that the average output current remains zero. If the load asymmetry is not counterbalanced, the SPA or UPS becomes inoperative. In another example, the load consists of only one resistor in series with the diode. No compensation is possible since the output current is unidirectional. A control circuit senses the DC voltage stored in the first capacitor. If the voltage becomes excessive, the SPA or UPS shuts down. In order to avoid that, a minimum load is added. The minimum load allows at least a minimal current flow in both directions.

An instantaneously interruptible power source ($I^2PS$) is introduced in this disclosure and the disclosure of the co-pending application titled "Precision Switching Power Amplifier and Uninterruptible Power System," filed on even date herewith. A unidirectional or bi-directional $I^2PS$ is equivalent to a conventional SPA or UPS respectively. However, some intrinsic features of the $I^2PS$ are in sharp contrast to common flaws of the conventional devices. The $I^2PS$ can instantaneously interrupt the correction, wherein a precise correction can be accomplished in every switching cycle. Moreover, the $I^2PS$ can become idle by the end of every switching cycle or remain idle over a period of many cycles. No energy is wasted on useless, ineffective or bogus correction when correction is unnecessary. Usually, accuracy of the output voltage produced by the UPS is nonessential. However, the employment of the bi-directional $I^2PS$, in place of a traditional UPS, results in reduced power dissipation. A less frequent correction of the output voltage is necessary. The $I^2PS$ is unidirectional, unless otherwise noted.

The unidirectional or bi-directional switching power apparatus according to the present invention converts at least one supply voltage into an AC output voltage. In one embodiment, a converter means converts the supply voltage or voltages into a current, and includes an inductive means for attaining the current. A first capacitive means stores a DC voltage. A switching means selectively applies the current to the first capacitive means. A rectifying means rectifies and applies the current to the first capacitive means. A second capacitive means is coupled in series with the first capacitive means for providing the AC output voltage. In another embodiment, a converter means converts the supply voltage or voltages into a binary voltage. An inductive means provides a return voltage in response to the binary voltage. A rectifying means limits the return voltage. A first capacitive means stores a DC voltage. A switching means selectively applies a sum of the DC voltage and the AC output voltage to the inductive means. A second capacitive means is coupled in series with the first capacitive means for providing the AC output voltage. In yet another embodiment, a source means provides the supply voltage or voltages. A first capacitive means stores a DC voltage. A first converter means converts the supply voltage or voltages into a first current applied to the first capacitive means. A second converter means converts a sum of the DC voltage and the AC output voltage into a second current applied to the source means. A second capacitive means is coupled in series with the first capacitive means for providing the AC output voltage.

A corrective current is equal to at least a portion of the current attained by the inductive means. The corrective current can be interrupted or uninterrupted even when the inductive means is connected to the first capacitive means. For example, the inductive means may consist of a flyback transformer. This transformer provides a secondary current when a primary current is interrupted, and vice versa. The corrective current is inherently interrupted in unidirectional and bi-directional $I^2PSs$. The first or second switching means can instantaneously interrupt flow of the corrective current. A current flowing through the second capacitive means is equal to a difference between the corrective current and the output current of the $I^2PS$. The latter current may be zero since no minimum load is required. Any UPS or bi-directional $I^2PS$ is capable of charging the battery when a low frequency voltage, in particular line voltage, is applied across the second capacitive means. Preferably, the charging is carried out at both halves of the AC voltage so that an average value of the charging current drawn from the AC source is zero. Moreover, the UPS or bi-directional $I^2PS$ can produce quasi- or pure-sinusoidal charging current. Obviously, any UPS or bi-directional $I^2PS$ can operate as an SPA or a unidirectional $I^2PS$ respectively. A conventional power supply can be substituted for the battery.

BRIEF DESCRIPTION OF THE DRAWINGS

The present invention will become more clear in conjunction with the accompanying figures of which.

DETAILED DESCRIPTION OF THE INVENTION

Figure 1:
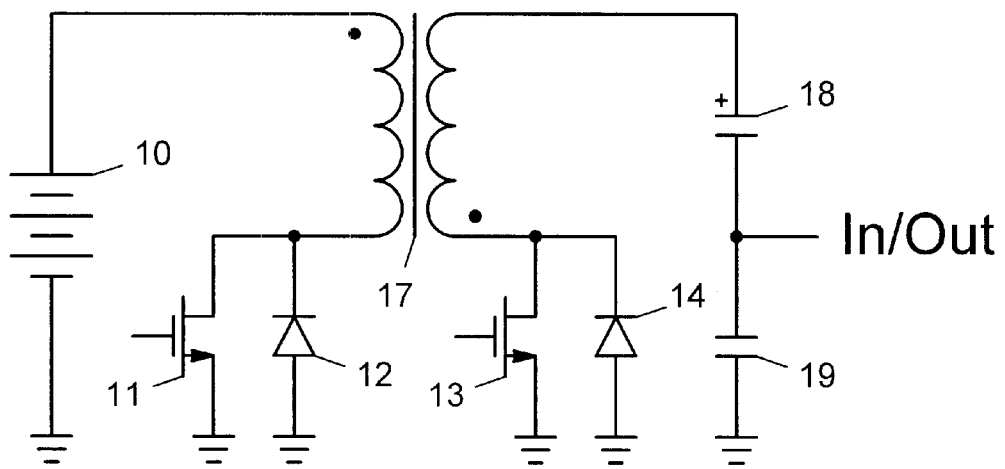
FIG. 1 is the preferred embodiment of a two-switch UPS with a flyback transformer.

FIG. 1 is the preferred embodiment of a two-switch UPS with a flyback transformer. A supply voltage provided by the battery 10 is applied to one end of the primary winding of the flyback transformer 17. The other end is tied to the drain of the switch 11 and the cathode of the diode 12. Similarly, one end of the secondary winding is connected to the capacitor 18. The other end is connected to the drain of the switch 13 and the cathode of the diode 14. The capacitor 19 is in series with the capacitor 18 and provides the AC output voltage of the UPS. All components are grounded except the transformer 17 and the capacitor 18. Moreover, primary and secondary ground references can be separated since the transformer 17 provides for galvanic isolation. On-chip diodes of the switches 11 and 13 can be used as the parallel-coupled diodes 12 and 14 respectively. A control circuit drives the switches 11 and 13 in response to a reference voltage and the output voltage. The reference voltage may derive from a sine wave oscillator generating a low frequency voltage. Switches used in this and the following embodiments are N-channel MOSFETs, unless otherwise noted. The switches are capable of conducting current in either direction as to bypass an internal and/or external drain-source diode.

The UPS employs a converter that converts the battery voltage into the corrective current. The converter comprises the components 11, 12 and 17. The primary winding of the transformer 17 attains a primary current and provides a return voltage. The switch 11 selectively applies the battery voltage to the transformer 17. The diode 12 limits the return voltage to the battery voltage. The secondary winding, electromagnetically coupled to the primary winding, attains the corrective current in response to the primary current. Therefore, the corrective current is equal to the secondary current of the transformer 17. The capacitor 18 stores a DC voltage. The switch 13 selectively applies the corrective current to ground and, consequently, to the capacitors 18 and 19. The diode 14 rectifies and applies the corrective current to ground, and thus to the capacitors 18 and 19.

The switch 11 turns on to increase the output voltage. The battery voltage is applied across the primary winding. The corrective current is zero as the switch 13 and the diode 14 are nonconductive. Therefore, the primary winding of the transformer 17 acts like an inductor. When the switch 11 turns off, the primary and secondary voltages reverse polarities. The diode 14 ensures flow of the corrective current. Energy stored in the transformer 17 is delivered to the capacitors 18 and 19. The switch 13 turns on in order to decrease the output voltage. A sum of the voltages stored in the capacitors 18 and 19 is applied across the secondary winding. The switch 11 is turned off. The UPS operates analogously, wherein the switches 11, 13 and the diodes 12, 14 exchange their roles. The capacitors 18, 19 and possibly the load act like the battery 10, whereas the battery 10 becomes the load. In particular, the diode 12 is reverse or forward polarized when the switch 13 is turned on or off respectively.

The capacitor 18 is charged to a voltage that is higher than amplitude of the output voltage produced by the UPS. By these means, the sum of the capacitor voltages is positive even when the output voltage reaches negative peak. The sum determines the rate at which the transformer 17 recharges while the switch 13 or the diode 14 conducts the corrective current. The capacitor 18 has also a significantly larger value than the capacitor 19. Therefore, an electrolytic capacitor symbolically depicts the capacitor 18 in the drawing. Variations of the DC voltage stored in the capacitor 18 are negligible within one switching cycle. Conversely, the output voltage stored in the capacitor 19 changes by a significant amount. A current recharging the capacitor 19 is equal to a difference between the corrective and output currents.

The switches 11 and 13 are turned off during reset of the transformer 17. The primary or corrective current flows through the diode 12 or 14 respectively. In either case, the respective current decays to zero. The switch 11 or 13 turns on substantially at zero voltage if the respective diode 12 or 14 conducts. Unless conduction phases of the switches 11 and 13 overlap, either switch can change state at any time. Therefore, the diode 12 or 14 can conduct before the switch 11 or 13 turns on and/or after it turns off. This is determined exclusively by polarity of the respective current, which polarity may be unaffected by the switching. Similar to the embodiments of FIGS. 2, 5 through 15 and possibly 16 through 18, the UPS can boost up the battery voltage. The embodiments of FIGS. 6 through 15 and possibly 16 through 18 also provide for line isolation.

The battery charging is performed when an AC voltage is applied across the capacitor 19. The AC voltage, in particular line voltage, has a low frequency. The switch 13 is energized as if to reduce the AC voltage. Preferably, the battery charging is carried out at positive halves of the AC voltage. The charging current drawn from the AC source is unidirectional and discharges the capacitor 18. Conversely, the capacitor 18 is recharged at negative halves of the AC voltage. The capacitor 18 charges up to negative peak of that voltage through the diode 14 and the secondary winding. Therefore, quasi-sinusoidal charging current can be produced. Possible saturation of the transformer 17 at peaks of the charging current is inconsequential. However, surge current protection may be necessary. For example, an inrush current limiter can be coupled in series with the diode 14 or the output of the UPS.

Figure 18:
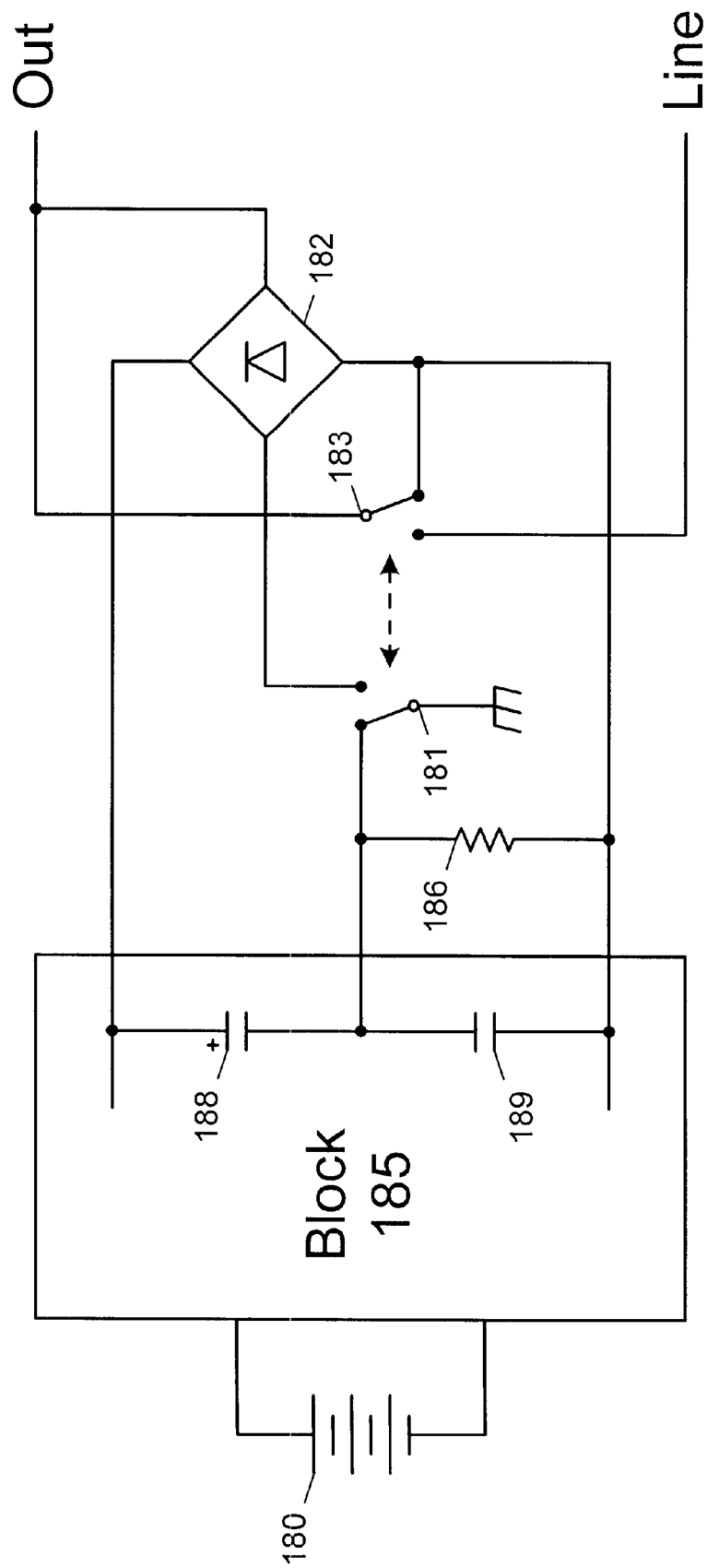
FIG. 18 is a block diagram of a UPS or a bi-directional $I^2PS$ with a relay incorporating transfer switch and allowing sinusoidal charging current.

When the battery 10 is fully charged, the UPS may not yet be ready for the forward conversion. The voltage of the capacitor 18 may be below the operational level. The capacitor voltage is increased by energizing the switch 11 and subsequently forcing the corrective current to flow in one direction. The capacitor 18 can charge up to the desired voltage even at a low level of the AC voltage. The block diagram of FIG. 18 illustrates an alternative method of charging the capacitor 18 and maintaining the DC voltage thereof. In particular, a sinusoidal charging current is produced by applying a rectified AC voltage directly to the secondary winding. The remarks pertaining to the capacitors 18 and 19 apply to all remaining embodiments disclosed herein. Each of these embodiments employs a pair of series-coupled output capacitors corresponding to the capacitors 18 and 19.

Figure 2:
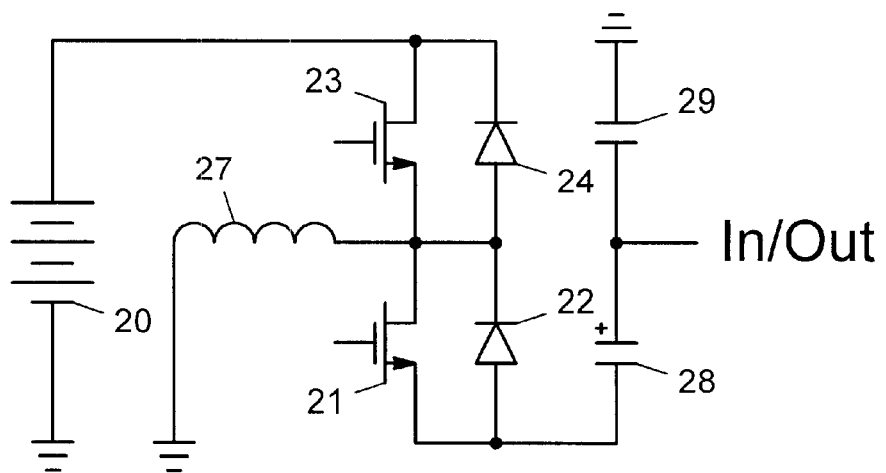
FIG. 2 is an embodiment of a two-switch UPS with a grounded inductor.

FIG. 2 is an embodiment of a two-switch UPS with a grounded inductor. The UPS operates similar to the FIG. 1 UPS. However, the inductor 27 is employed for attaining the corrective current and charging the battery 20. This overcomes many inherent flaws of a transformer, such as leakage inductance and inter-winding capacitance. Moreover, a sum of voltages stored in the output capacitors is negative even when the output voltage reaches positive peak. Specifically, the voltage of the battery 20 is applied to the drain of the switch 23 and the cathode of the diode 24. The drain of the switch 21, the source of the switch 23, the cathode of the diode 22 and the anode of the diode 24 are tied to the inductor 27. The source of the switch 21 and the anode of the diode 22 are connected to the capacitor 28. The capacitor 29 is in series therewith and provides the output voltage of the UPS. The battery 20, the inductor 27 and the capacitor 29 are grounded.

The switch 23 turns on to decrease the output voltage. The battery voltage is applied across the inductor 27. The corrective current is zero as the switch 21 and the diode 22 are nonconductive. When the switch 23 turns off, the diode 22 takes over the inductor current. The corrective current is equal thereto, wherein energy stored in the inductor 27 is delivered to the capacitors 28 and 29. The switch 21 turns on in order to increase the output voltage. The sum of the capacitor voltages is applied across the inductor 27. The switch 23 is turned off. The UPS operates analogously, wherein the switches 21, 23 and the diodes 22, 24 exchange their roles. The capacitors 28, 29 and possibly the load act like the battery 20, whereas the battery 20 becomes the load. In particular, the diode 24 is reverse or forward polarized when the switch 21 is turned on or off respectively. Similarly, the switch 21 is energized to perform the battery charging while an AC voltage is applied across the capacitor 29. The UPS operates as if to increase the AC voltage. In particular, the capacitor 28 discharges at negative halves of the AC voltage. It charges up to positive peak of the AC voltage through the diode 22 and the inductor 27.

Figure 3:
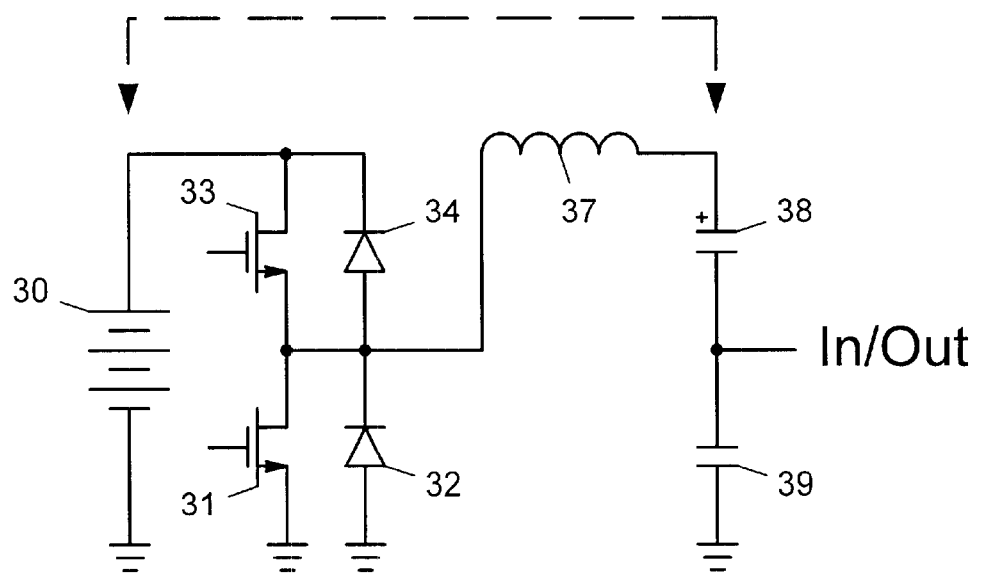
FIG. 3 is an embodiment of a two-switch UPS with a floating inductor.

FIG. 3 is an embodiment of a two-switch UPS with a floating inductor. In contrast to the embodiments of FIGS. 1 and 2, the corrective current is uninterrupted. The voltage of the battery 30 is applied to the drain of the switch 33 and the cathode of the diode 34. The inductor 37 is connected to the drain of the switch 31, the source of the switch 33, the cathode of the diode 32 and the anode of the diode 34. The inductor 37 and the capacitors 38, 39 are in series. The output voltage appears across the capacitor 39. The battery 30, the source of the switch 31, the anode of the diode 32 and the capacitor 39 are grounded.

The switch 33 and the diode 32 constitute a simplest converter for converting the battery voltage into a binary voltage. Accordingly, the binary voltage reaches a high or low level when the switch 33 or the diode 32 conducts the corrective current respectively. The high or low level is maintained when the diode 34 or the switch 31 conducts the corrective current respectively. The inductor 37 attains the corrective current and provides a return voltage in response to the binary voltage. The diode 34 limits the return voltage to the battery voltage. The switch 31 selectively applies a sum of the voltages stored in the capacitors 38 and 39 to the inductor 37.

Specifically, the switch 33 turns on to increase the output voltage. The switch 31 is turned off. A voltage applied across the inductor 37 is approximately equal to a difference between the battery voltage and the sum of the capacitor voltages. Therefore, the corrective current increases at a rate determined by that difference. The capacitor 38 is charged to a voltage that is higher than amplitude of the output voltage, as pointed out hereinbefore. The battery voltage is greater than the sum of the capacitor voltages even when the output voltage reaches positive peak. Therefore, the battery voltage is also greater than peak-to-peak level of the output voltage. When the switch 33 turns off, the diode 32 applies the corrective current to ground.

Similarly, the switch 31 turns on to decrease the output voltage. The switch 33 is turned off. A voltage applied across the inductor 37 is approximately equal to the sum of the capacitor voltages. The sum is positive even when the output voltage reaches negative peak. The corrective current increases in the reverse direction at a rate determined by the sum. When the switch 31 turns off, the diode 34 applies the corrective current to the battery 30. If both switches 31 and 33 are turned off, the corrective current continues to flow through the capacitors 38 and 39 while decaying to zero. When the corrective current reaches zero, both diodes 32 and 34 are cut off. Subsequently, the switch 31 or 33 turns on at zero current. By contrast, the switch 31 or 33 turns on at zero voltage if the respective diode 32 or 34 conducts the corrective current. The battery charging is performed when an AC voltage is applied across the capacitor 39. The UPS operates as if to reduce the AC voltage.

The battery 30 provides the supply voltage that, by definition, has one polarity. The sum of the capacitor voltages is positive even when the output voltage is at negative peak. The connections to the battery 30 and the capacitor 38 can be exchanged. This is marked in the drawing. Accordingly, the sum of the capacitor voltages becomes the supply voltage of the UPS, whereas the battery 30 acts like a load. The capacitor 39 still provides the output voltage of the UPS. A similar modification in the embodiments of FIGS. 1 and 2 would be indistinguishable without detailed analysis. Moreover, all bi-directional embodiments in this disclosure can be modified in the same manner. The only exception is the FIG. 18 embodiment in which separate terminals are used for input and output.

Furthermore, some properties of the modified embodiments are altered. For example, the I$^2$PS of FIG. 12 becomes a UPS.

Figure 4:
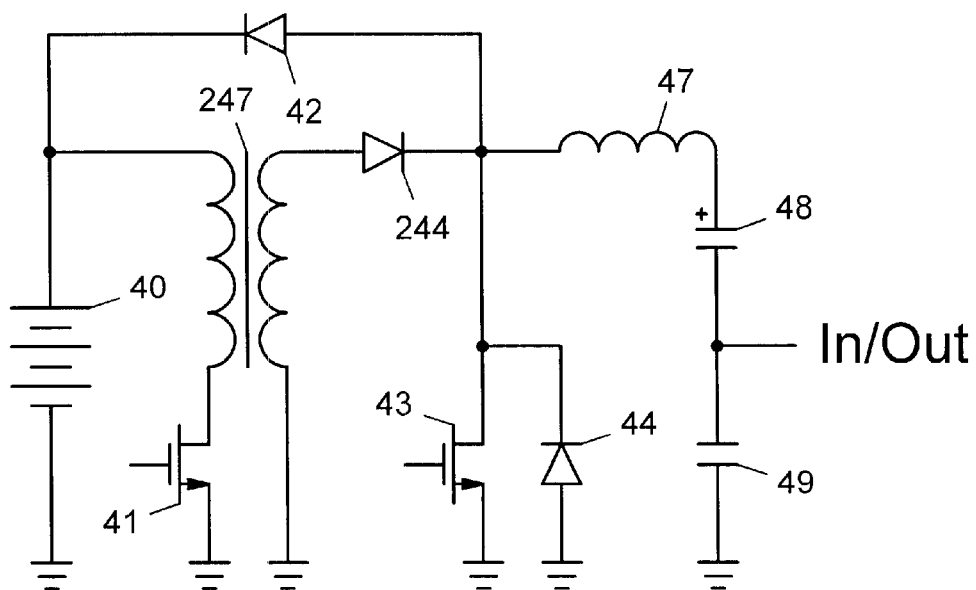
FIG. 4 is an embodiment of a two-switch UPS with a flyback or forward transformer and an output inductor.

FIG. 4 is an embodiment of a two-switch UPS with a flyback or forward transformer and an output inductor. Similar to the FIG. 3 UPS, the corrective current is uninterrupted and equal to an inductor current. The transformer 247 may be of flyback or forward type. Therefore, polarities of the windings are unmarked in the drawing. The voltage of the battery 40 is applied to one end of the primary winding and the cathode of the diode 42. The other end is tied to the drain of the switch 41. The secondary winding is connected to the anode of the diode 244. The inductor 47 is tied to the drain of the switch 43, the anode of the diode 42 and the cathodes of the diodes 44, 244. The inductor 47 and the capacitors 48, 49 are in series. The output voltage appears across the capacitor 49. The battery 40, the sources of the switches 41, 43, the anode of the diode 44, the capacitor 49 and the secondary winding are grounded.

A converter comprises the components 41, 44, 244 and 247 for converting the battery voltage into a binary voltage. The switch 41 selectively applies the battery voltage across the primary winding of the transformer 247. Consequently, the secondary winding provides a secondary current in response to a primary current. The diodes 44 and 244 rectify the secondary current and yield the binary voltage. The binary voltage reaches a high or low level when the diode 244 or 44 conducts the corrective current respectively. The high or low level is maintained when the diode 42 or the switch 43 conducts the corrective current respectively. The inductor 47 attains the corrective current and provides a return voltage in response to the binary voltage. The diode 42 limits the return voltage substantially to the battery voltage. The switch 43 selectively applies a sum of the voltages stored in the capacitors 48 and 49 across the inductor 47. The inductor 47 and the transformer 247 may be also considered an inductive means for attaining the corrective current and providing the return voltage. The inductor 47 and the secondary winding of the transformer 247 are coupled in series via the diode 244. The transformer 247 attains the secondary current. In response thereto, the inductor 47 provides the corrective current. Furthermore, the inductor 47 and/or the secondary winding provide the return voltage.

The instant converter resembles a conventional flyback or forward converter, whereas the diode 44 is substituted for an output capacitor. Accordingly, other DC/DC converters can be implemented. For example, a half-bridge converter can be used to convert a pair of supply voltages into the secondary current of the transformer 247. Moreover, a full-wave rectification is accomplished by using a diode bridge instead of the diode 244. A push-pull converter is carried out by expanding the transformer 247, and adding a grounded switch and a diode. Specifically, the primary winding is connected between the switch 41 and the additional switch. The battery voltage is applied to a primary center tap and to the diode 42. The secondary winding is connected between the diode 244 and the additional diode. These diodes are further tied to the switch 43, the diodes 42, 44 and the inductor 47. A secondary center tap is grounded. All these modifications would have been obvious to persons skilled in the art. The embodiments shown in this disclosure are simplest and thus least apparent.

In the flyback version, the transformer 247 is of flyback type. The switch 41 turns on to increase the output voltage. The secondary voltage is negative and the diode 244 is cut off. Moreover, the corrective current decays. The diode 42 or 44 conducts the corrective current, wherein the binary voltage is high or low respectively. In the latter case, the switch 43 can close to eliminate power loss of the diode 44. When the switch 41 is turned off, the diode 244 conducts the secondary current. The diode 42 or 44 conducts a difference between the secondary and corrective currents. By minimizing that difference, most efficient operation of the UPS is accomplished. Specifically, if the diode 42 conducts, the transformer 247 returns energy to the battery 40. If the diode 44 conducts, the secondary winding is effectively shorted and transformer reset is delayed. When the corrective current reaches the level of the secondary current, energy stored in the transformer 247 is delivered to the capacitors 48 and 49.

In the forward version, the transformer 247 is of forward type. The switch 41 turns on to increase the output voltage. The switch 43 is turned off. The secondary voltage is positive and proportional to the battery voltage, wherein the binary voltage is high. If the diode 42 conducts the corrective current, the diode 244 is cut off until that current drops to zero. Otherwise, the diode 244 immediately takes over the corrective current. When the switch 41 turns off, the diode 42 or 44 conducts the corrective current. The binary voltage is high or low respectively. Similar to the flyback version, the diodes 44 and 244 can share the corrective current. This remark applies also to following embodiments that employ parallel-coupled diodes. One of the diodes is in series with a primary or secondary winding of the respective transformer. For the purpose of simplicity, the disclosure may refer merely to the other diode, such as 44.

The switch 43 turns on to decrease the output voltage. The binary voltage having the low level is enforced regardless of the transformer type. The switch 41 is turned off. All diodes are cut off if the transformer 247 is of flyback type and reset, or if it is of forward type. A voltage applied across the inductor 47 is approximately equal to the sum of the capacitor voltages. When the switch 43 turns off, the diode 42 applies the corrective current to the battery 40. The battery voltage is greater than the sum even when the output voltage reaches positive peak. The battery charging is performed when an AC voltage is applied across the capacitor 49. The UPS operates as if to reduce the AC voltage.

Figure 5:
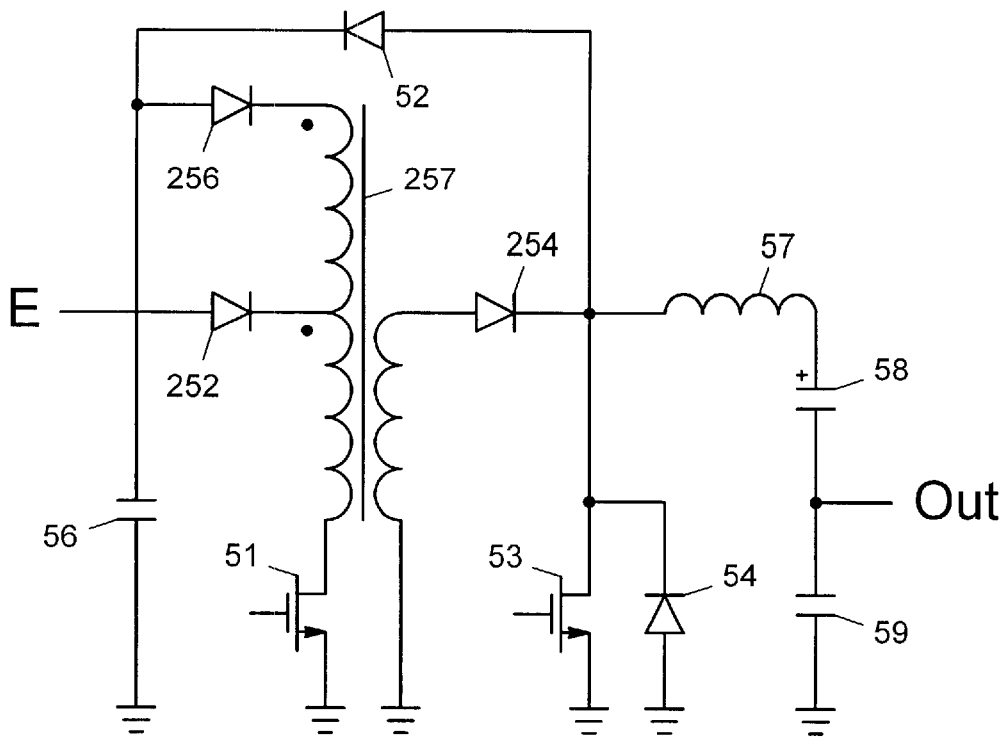
FIG. 5 is the preferred embodiment of a two-switch SPA with a flyback or forward transformer and an output inductor.

FIG. 5 is the preferred embodiment of a two-switch SPA with a flyback or forward transformer and an output inductor. The SPA is based on the FIG. 4 UPS, whereas conversion is unidirectional. On the other hand, a supply voltage is boosted up. The components 51 through 54, 57 through 59 and 254 are connected as the components 41 through 44, 47 through 49 and 244 of FIG. 4 respectively. However, the cathode of the diode 52 is connected to the anode of the optional diode 256 and the capacitor 56. The primary winding of the transformer 257 is tied between the drain of the switch 51 and the cathode of the diode 256. The supply voltage E is applied to the anode of the diode 252. A tap of the primary winding is connected to the cathode of this diode. The secondary winding is tied to the anode of the diode 254. The transformer 257 may be of flyback or forward type. Therefore, polarity of the secondary winding is unmarked in the drawing. The sources of the switches 51, 53, the anode of the diode 54, the capacitors 56, 59 and the secondary winding are grounded.

A converter comprises the components 51, 54, 56, 252, 254, 256 and 257 for converting E into a binary voltage. The diode 256 improves performance of the converter by minimizing a peak current of the switch 51. The capacitors 58 and 56 store first and second DC voltages respectively. The capacitor 56 may be considered a voltage source. Accordingly, the second DC voltage becomes another supply voltage. Furthermore, the converter converts a pair of supply voltages into the binary voltage. The switch 51 selectively applies E across the respective portion of the primary winding. However, the switch 51 selectively applies the second DC voltage across the primary winding if that voltage is greater than E by a predetermined factor.

Specifically, the primary winding has the tap and hence acts like an autotransformer regardless of the transformer type. The second DC voltage stored in the capacitor 56 can be significantly larger than E. When the switch 51 is turned on, the diode 256 conducts the primary current if the second DC voltage is excessive. Otherwise, the diode 252 conducts the primary current. A difference between currents flowing through the diodes 52 and 256 recharges the capacitor 56. Specifically, the diode 52 can conduct a difference between the secondary and corrective currents if the transformer 257 is of flyback type. A return voltage of the inductor 57 and/or the transformer 257 is limited to the second DC voltage. The diode 52 can also conduct the corrective current if the transformer 257 is of forward type. The return voltage of the inductor 57 is limited to the second DC voltage. The second DC voltage can be smaller than E if connections to the anodes of the diodes 252 and 256 are exchanged.

Figure 6:
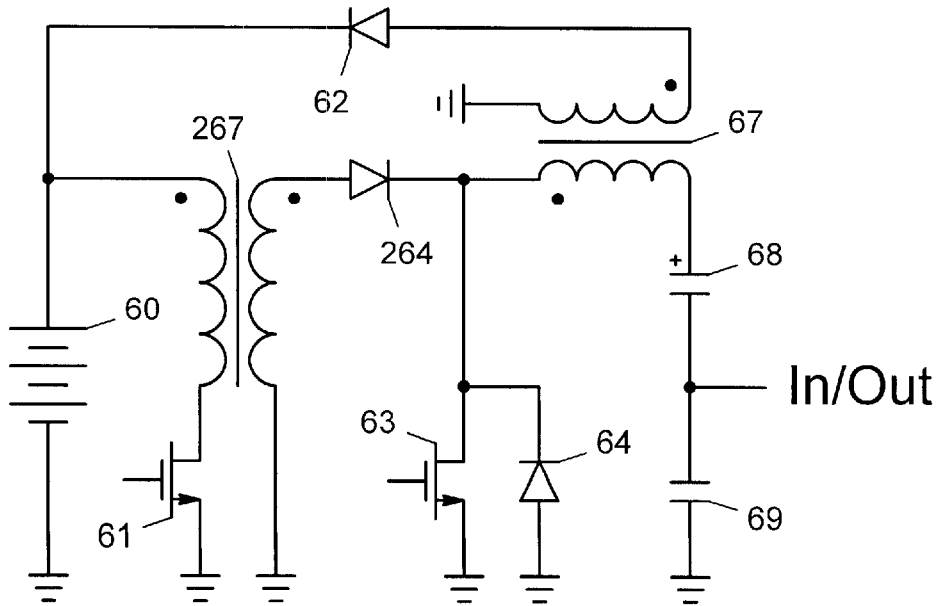
FIG. 6 is the preferred embodiment of a two-switch UPS with forward and flyback transformers.

FIG. 6 is the preferred embodiment of a two-switch UPS with forward and flyback transformers. The UPS combines best features of the UPS of FIG. 1 and the SPA of FIG. 5. In particular, line isolation and boosting of the battery voltage are accomplished. The components 60 through 64, 67 through 69, 264 and 267 are connected as the components 40 through 44, 47 through 49, 244 and 247 of FIG. 4 respectively. However, the primary winding of the flyback transformer 67 corresponds to the inductor 47 of FIG. 4. The secondary winding, electromagnetically coupled to the primary winding, is added. The primary winding of the transformer 67 attains the corrective current, whereas the secondary winding provides a return voltage. Moreover, this secondary winding is grounded and in series with the diode 62.

The switch 61 turns on to increase the output voltage. The switch 63 is turned off. The corrective current is equal to the primary current of the transformer 67 and to the secondary current of the transformer 267. Specifically, the secondary voltage of the forward transformer 267 is proportional to the battery voltage. The secondary voltage is higher than a sum of the voltages stored in the capacitors 68 and 69 even at positive peak of the output voltage. Therefore, the diode 264 conducts the corrective current. A difference between that secondary voltage and the sum is equal to the primary voltage of the transformer 67. The difference determines a rate at which the corrective current increases. The difference peaks when the output voltage reaches negative peak. However, the turns ratio of the transformer 67 is set so that the diode 62 is cut off. Therefore, the primary winding of the transformer 67 acts like an inductor. When the switch 61 turns off, the diode 64 takes over the corrective current. The sum of the capacitor voltages is the primary voltage of the transformer 67. The corrective current decays to zero.

The switch 63 turns on to decrease the output voltage. The switch 61 is turned off. Again, the primary voltage of the transformer 67 is equal to the sum of the capacitor voltages. The corrective current flows in the reverse direction but remains equal to the primary current of the transformer 67. However, when the switch 63 turns off, the corrective current collapses to zero. Energy stored in the transformer 67 is delivered through the diode 62 to the battery 60. The secondary voltage is limited to the battery voltage. Accordingly, the primary voltage of the transformer 67 is also limited. The reverse energy flow continues until the transformer 67 is reset or the switch 63 turns on again. The battery charging is performed when an AC voltage is applied across the capacitor 69. The UPS operates as if to reduce the AC voltage.

Figure 7:
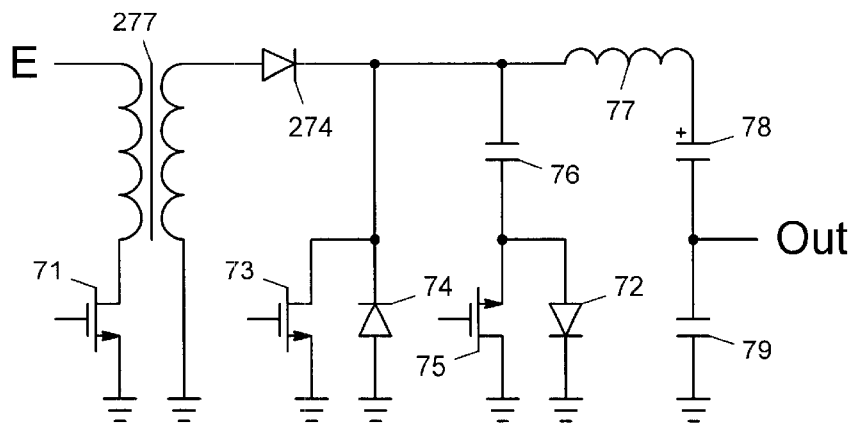
FIG. 7 is an embodiment of an SPA with a flyback or forward transformer and an output inductor.

FIG. 7 is an embodiment of an SPA with a flyback or forward transformer and an output inductor. Similar to the embodiments of FIGS. 3 through 5, the corrective current is uninterrupted and equal to an inductor current. However, line isolation is accomplished. The transformer 277 may be of flyback or forward type. Therefore, polarities of the windings are unmarked in the drawing. A supply voltage E is applied to one end of the primary winding. The other end is tied to the drain of the switch 71. The secondary winding is connected to the anode of the diode 274. The inductor 77 is connected to the drain of the switch 73, the cathodes of the diodes 74, 274 and the capacitor 76. This capacitor is further connected to the source of the switch 75 and the anode of the diode 72. The inductor 77 and the capacitors 78, 79 are in series. The output voltage appears across the capacitor 79. The sources of the switches 71, 73, the drain of the switch 75, the cathode of the diode 72, the anode of the diode 74, the capacitor 79 and the secondary winding are grounded.

A converter comprises the components 71, 74 through 76, 274 and 277 for converting E and a second DC voltage into a binary voltage. The second DC voltage is thus considered another supply voltage. The capacitor 76 stores the second DC voltage. The components 72 and 75 are connected in parallel and further in series with the capacitor 76. The order of this series connection can be reversed so that the capacitor 76 is grounded instead and available for auxiliary snubbing. The binary voltage reaches a high or low level when the diode 72 or 74 conducts respectively. The high or low level is enforced when the switch 75 or 73 conducts respectively. The diode 274 can conduct at either level if the transformer 277 is of flyback type. The inductor 77 attains the corrective current and provides a return voltage in response to the binary voltage. The diode 72 limits the return voltage substantially to the second DC voltage. Other DC/DC converters, such as a conventional half-bridge or push-pull converter, can be used as the instant converter. This is pointed out hereinbefore. The inductor 77 may be also considered a part of the converter. This expanded converter converts E and the second DC voltage into the corrective current. If the transformer 277 is of flyback type, it can also provide the return voltage.

The switch 71 turns on to increase the output voltage. The switch 73 and, preferably, the switch 75 are turned off. If the transformer 277 is of flyback type, the secondary voltage is negative and the diode 274 is cut off. The diode 72 or 74 conducts the corrective current. When the switch 71 turns off, the diode 274 conducts the secondary current of the transformer 277. The diode 72 or 74 conducts a difference between the secondary and corrective currents. By minimizing that difference, energy stored in the transformer 277 is most efficiently delivered to the capacitors 78 and 79. Accordingly, the diodes 72 and 74 are cut off when the secondary and corrective currents become equal.

If the transformer 277 is of forward type and the switch 71 is turned on, the secondary voltage is positive and proportional to the input voltage. The secondary voltage is smaller than the second DC voltage and greater than a sum of the voltages stored in the capacitors 78 and 79. If the diode 72 conducts the corrective current, the diode 274 is cut off until that current drops to zero. Otherwise, the diode 274 immediately takes over t he corrective current. Wh en the switch 71 turns off, the diode 74 takes over the corrective current. The switch 73 selectively applies the corrective current to ground. It turns on to decrease the output voltage. The switches 71 and 75 are turned off. The sum of the capacitor voltages is applied across the inductor 77. When the switch 73 turns off, the diode 72 takes over the corrective current that charges the capacitor 76.

The switch 75 is energized when the second DC voltage exceeds a predetermined level. The switch 73 and, preferably, the switch 71 a re turned off. The diodes 74 and 274 are cut off. The switch 75 applies the second DC voltage to the inductor 77. The corrective current is applied to the capacitor 76 in order to discharge it. The second DC voltage is greater than the sum of the capacitor voltages, even at positive peak of the output voltage. The result is the same as when the diode 274 conducts the corrective current. However, energy derives from the capacitor 76, whereas the transformer 277 is idle. When the switch 75 turns off, the diode 74 takes over t he corrective current.

Figure 8:
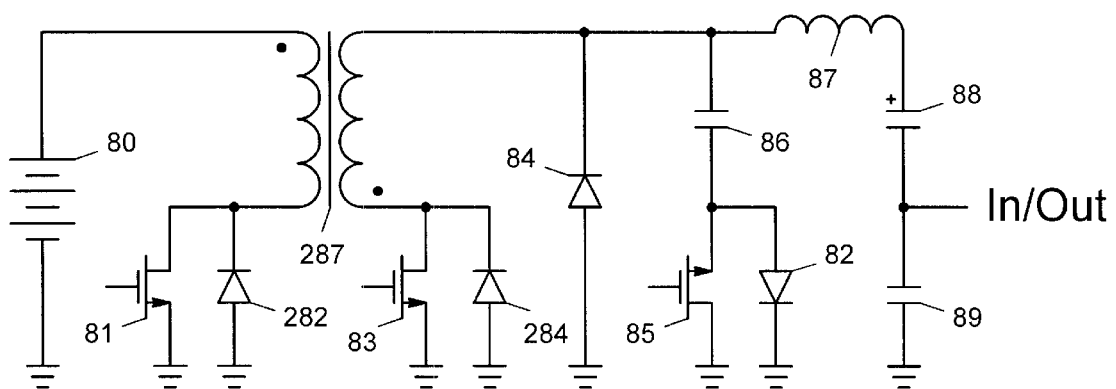
FIG. 8 is an embodiment of a UPS with a flyback transformer and an output inductor.

FIG. 8 is an embodiment of a UPS with a flyback transformer and an output inductor. The UPS is based on the FIG. 7 SPA, whereas the bi-directional conversion is accomplished. The voltage of the battery 80 is applied to one end of the primary winding of the flyback transformer 287. The other end is tied to the drain of the switch 81 and the cathode of the diode 282. One end of the secondary winding is connected to the cathode of the diode 84, the capacitor 86 and the inductor 87. The other end is connected to the drain of the switch 83 and the cathode of the diode 284. The capacitor 86 is further connected to the source of the switch 85 and the anode of the diode 82. The inductor 87 and the capacitors 88, 89 are in series. The output voltage appears across the capacitor 89. The battery 80, the sources of the switches 81, 83, the drain of the switch 85, the cathode of the diode 82, the anodes of the diodes 84, 282, 284 and the capacitor 89 are grounded.

The switch 81 turns on to increase the output voltage. The switch 83 and, preferably, the switch 85 are turned off. The diode 82 or 84 conducts the corrective current. The diode 284 is reverse polarized. When the switch 81 turns off, the diode 284 conducts the secondary current. The diode 82 or 84 conducts a difference between the secondary and corrective currents. Accordingly, the diodes 82 and 84 are cut off when these currents become equal. Similarly, the switch 85 turns on to increase the output voltage when the second DC voltage exceeds a predetermined level. The second DC voltage is greater than the sum of the capacitor voltages. The result is the same as when the diode 284 conducts the corrective current. However, energy derives from the capacitor 86, whereas the transformer 287 is idle.

The switch 83 turns on to decrease the output voltage. The switch 81 is turned off. If the diode 84 conducts the corrective current, the switch 83 has no effect. Conversely, a second DC voltage stored in the capacitor 86 is applied across the secondary winding if the switch 85 or the diode 82 conducts the corrective current. If the switch 85 is open and the diodes 82, 84 are nonconductive; the corrective current is applied to the secondary winding. A sum of the voltages stored in the capacitors 88 and 89 is applied to a voltage divider consisting of the inductor 87 and the secondary winding. When the switch 83 turns off, the diode 282 returns energy stored in the transformer 287 to the battery 80. The secondary current collapses to zero. If the switch 85 remains turned on, a current recharging the capacitor 86 is reduced to the corrective current. Otherwise, the diode 82 or 84 takes over the corrective current. The battery charging is performed when an AC voltage is applied across the capacitor 89. The UPS operates as if to reduce the AC voltage. In particular, the switch 83 is energized and the switch 81 is inactive. The switch 85 turns on when the second DC voltage exceeds the predetermined level.

Figure 9:
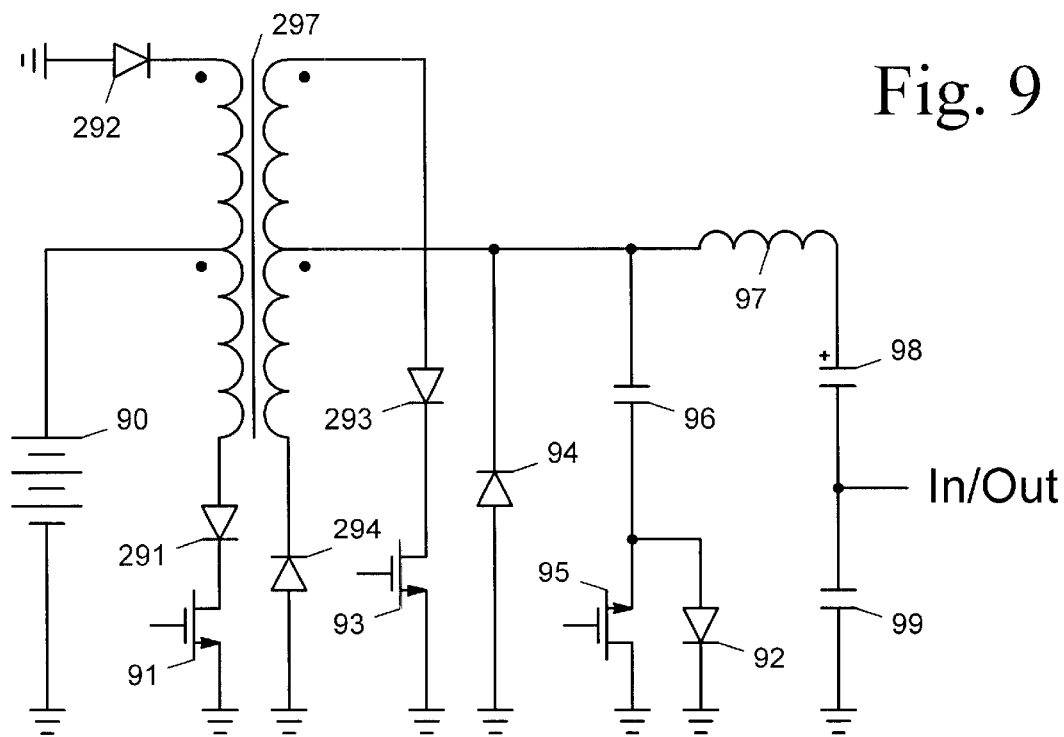
FIG. 9 is an embodiment of a UPS with a forward transformer and an output inductor.

FIG. 9 is an embodiment of a UPS with a forward transformer and an output inductor. The embodiment is based on the FIG. 8 UPS, whereas the forward transformer 297 is used for the bi-directional conversion. The components 90, 92, 94 through 99 and 294 are connected as the components 80, 82, 84 through 89 and 284 of the FIG. 8 UPS respectively. However, the transformer 297 is expanded. The voltage of the battery 90 is applied to a primary center tap. The primary winding is connected between the anode of the diode 291 and the cathode of the diode 292. Similarly, the secondary winding is connected between the anode of the diode 293 and the cathode of the diode 294. The drains of the switches 91 and 93 are connected to the cathodes of the diodes 291 and 293 respectively. A secondary tap is tied to the cathode of the diode 94, the capacitor 96 and the inductor 97. Moreover, a number of turns between the diode 293 and the secondary tap is smaller than number of turns between the diode 294 and that tap. The output voltage appears across the capacitor 99. The battery 90, the sources of the switches 91, 93, the drain of the switch 95, the cathode of the diode 92, the anodes of the diodes 94, 292, 294 and the capacitor 99 are grounded.

The switch 91 turns on to increase the output voltage. The switch 93 is turned off. Therefore, the UPS operates as the SPA of FIG. 7 with the forward transformer. In particular, the diode 294 is cut off if the switch 95 or the diode 92 conducts the corrective current. Otherwise, the diode 294 conducts the corrective current that is equal to the secondary current of the transformer 297. When the switch 91 turns off, the diode 94 takes over the corrective current. Moreover, the primary and secondary voltages reverse polarities. The diode 292 conducts the magnetizing current during transformer reset. The diode 293 protects the switch 93. Similarly, the switch 95 turns on to increase the output voltage when the capacitor 96 is charged too much. However, the transformer 297 is idle.

The switch 93 selectively applies the corrective current to ground. It turns on to decrease the output voltage. The switches 91 and 95 are turned off. The respective portion of the secondary winding is effectively grounded. The inductor 97 and that portion constitute a voltage divider. A sum of the voltages stored in the capacitors 98 and 99 is applied across the divider. The secondary voltage appearing at the secondary tap is effectively amplified due to the reduced number of turns between the diode 293 and the secondary tap. The respective turns ratio is chosen so that the diode 292 conducts even at negative peak of the output voltage. The secondary voltage is limited to the battery voltage divided by that turns ratio. When the switch 93 turns off, the primary and secondary voltages reverse polarities. The diode 294 conducts the magnetizing current during transformer reset. Furthermore, a sum of the magnetizing and corrective currents flows through the diode 92 and charges the capacitor 96. The diode 291 protects the switch 91. Similarly, the switch 93 is energized to perform the battery charging while an AC voltage is applied across the capacitor 99. The UPS operates as if to reduce the AC voltage.

Figure 10:
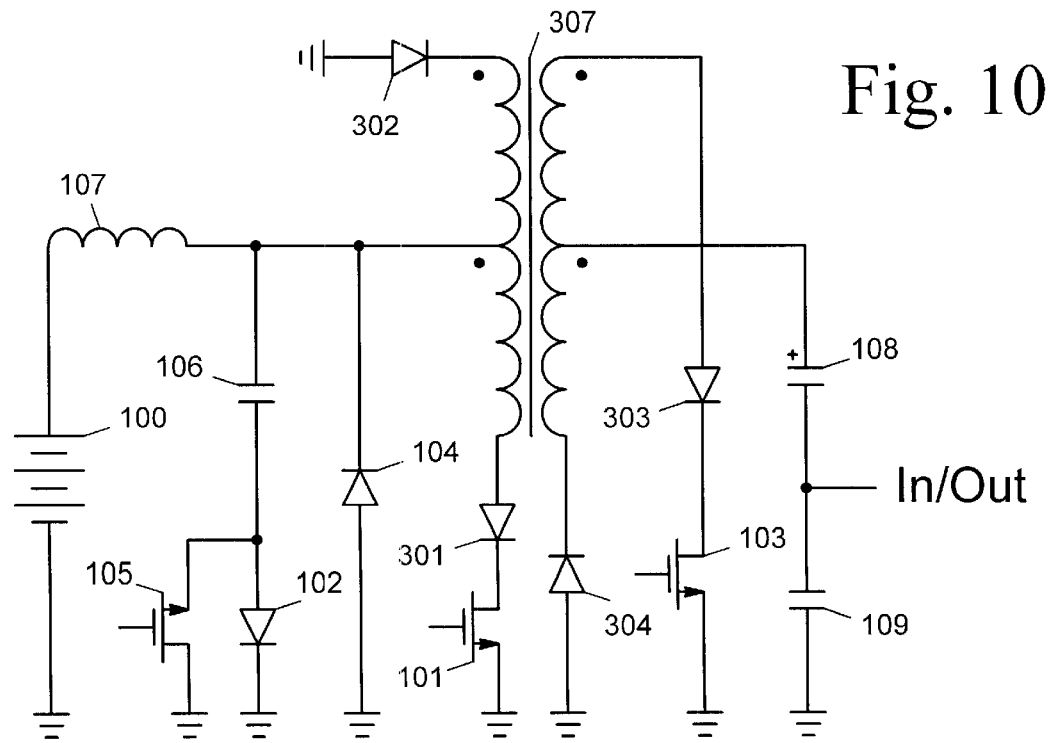
FIG. 10 is an embodiment of a bi-directional $I^2PS$ with a forward transformer and an input inductor.

FIG. 10 is an embodiment of a bi-directional I$^2$PS with a forward transformer and an input inductor. The embodiments of FIGS. 3 through 5 and 7 through 9 each employ an output inductor for attaining the corrective current. The corrective current continues to flow regardless of states of switches; it cannot be interrupted. The remaining embodiments disclosed hereinbefore fall into the same category. In the FIG. 1 embodiment, the corrective current is zero when the switch 11 is turned on. The flyback transformer 17 generates the corrective current when the switch 11 is turned off. Although the corrective current can be precisely controlled, it cannot be effectively terminated. The only way to instantaneously cut off the corrective current is by turning the switch 11 on again. However, this results in a buildup of energy stored in the transformer 17. The corrective current is even higher next time the switch 11 turns off. Similar remarks apply to the UPS of FIG. 2. The UPS of FIG. 6 employs the flyback transformer 67 that acts like an inductor. The corrective current can be terminated only when the switch 63 turns off to reset the transformer 67. One method of carrying out the bi-directional I$^2$PS is a bi-directional converter having a current output but lacking the output inductor. Other methods are disclosed in the co-pending application titled "Precision Switching Power Amplifier and Uninterruptible Power System," filed on even date herewith.

The instant bi-directional I$^2$PS is similar to the FIG. 9 embodiment. Specifically, the components 100 through 109, 301 through 304 and 307 correspond to the components 90 through 99, 291 through 294 and 297 of FIG. 9 respectively. However, the components 102 and 104 through 107 operate on the primary rather than the secondary side of the forward transformer 307. The voltage of the battery 100 is applied to the inductor 107. The primary winding is connected between the anode of the diode 301 and the cathode of the diode 302. The drain of the switch 101 is connected to the cathode of the diode 301. A primary center tap is tied to the cathode of the diode 104, the capacitor 106 and the inductor 107. The capacitor 106 is further connected to the source of the switch 105 and the anode of the diode 102. The components 102 and 105 can be connected to the battery 100 rather than ground. This feature is not shown in the drawing. Moreover, the components 102 and 105 are connected in parallel and further in series with the capacitor 106. The order of this series connection can be reversed.

The secondary winding is connected between the anode of the diode 303 and the cathode of the diode 304. The drain of the switch 103 is connected to the cathode of the diode 303. The capacitor 108 is tied to a secondary tap. The capacitor 109 is in series with the capacitor 108 and provides the output voltage of the I$^2$PS. Similar to the FIG. 9 UPS, there are fewer turns between the secondary tap and the diode 303 than between that tap and the diode 304. The battery 100, the sources of the switches 101, 103, the drain of the switch 105, the cathode of the diode 102, the anodes of the diodes 104, 302, 304 and the capacitor 109 are grounded.

The switch 101 turns on to increase the output voltage. The respective turns ratio of the transformer 307 is chosen so that the corrective current is supplied even at positive peak of the output voltage. The switch 101 applies the inductor current to the primary winding. Therefore, the primary and secondary currents of the transformer 307 are equal to the inductor and corrective currents respectively. The corrective current is limited to the inductor current multiplied by the turns ratio. The diode 304 conducts the corrective current, wherein the secondary voltage is approximately equal to a sum of the voltages stored in the capacitors 108 and 109. Therefore, the primary voltage is limited to the sum multiplied by the turns ratio.

When the switch 101 turns off, the diode 102 conducts the inductor current that charges the capacitor 106. Moreover, the primary and secondary voltages reverse polarities. The diode 302 conducts the magnetizing current during transformer reset. The corrective current is immediately cut off as the secondary winding is effectively disconnected. The diode 303 protects the switch 103. It is reverse polarized if the output voltage is below a threshold. The switch 105 is energized when a second DC voltage stored in the capacitor 106 exceeds a predetermined level. The switch 105 turns on to apply the inductor current to the capacitor 106. The switches 101 and 103 are turned off. Polarity of the inductor current is reversed. Energy is fed back from the capacitor 106 to the battery 100. When the switch 105 turns off, the diode 104 takes over the inductor current.

The switch 103 selectively applies the corrective current to ground. It turns on to decrease the output voltage. The corrective current is again proportional to the inductor current. Similarly, the primary voltage is proportional to the sum of the capacitor voltages. However, the respective turns ratio is larger since the switch 103 conducts the corrective current and the diode 304 is cut off. As a result, the primary voltage is greater than the battery voltage even when the output voltage reaches negative peak. Moreover, the primary voltage is smaller than the voltage stored in the capacitor 106 so that the diode 102 is cut off. The inductor current flows through the diode 302 and charges the battery 100. When the switch 103 turns off, the corrective current collapses to a negligible level. Specifically, the primary and secondary voltages reverse polarities. The diode 304 takes over the corrective current that is reduced merely to the magnetizing current. The diode 104 takes over the inductor current that decays to zero. The diode 301 protects the switch 101. Similarly, the switch 103 is energized to perform the battery charging while an AC voltage is applied across the capacitor 109. The I²PS operates as if to reduce the AC voltage.

The I²PS can be divided into two basic blocks: a front-end and a converter. The front-end drives the converter and consists of the components 102 and 104 through 107. The components 101, 103, 301 through 304 and 307 constitute a bi-directional forward converter with a DC output. The front-end operates on the primary side and thus takes advantage of the converter topology. The front-end operates as a voltage-to-current converter in the forward direction and a current-to-voltage converter in the reverse direction. The inductor 107 acts like a bi-directional current limiter. The remaining components of the front-end form an active snubber. Moreover, the second DC voltage of the capacitor 106 can be used for auxiliary snubbing. The method for driving a converter by the front-end is disclosed in the co-pending application titled "Switching Power Supplies Incorporating Power Factor Correction and/or Switching at Resonant Transition," filed on even date herewith. The instant front-end and other examples are also disclosed in that application. Each front-end is capable of driving a variety of converters, including the forward converter. Moreover, each front-end is used for power factor correction.

Figure 11:
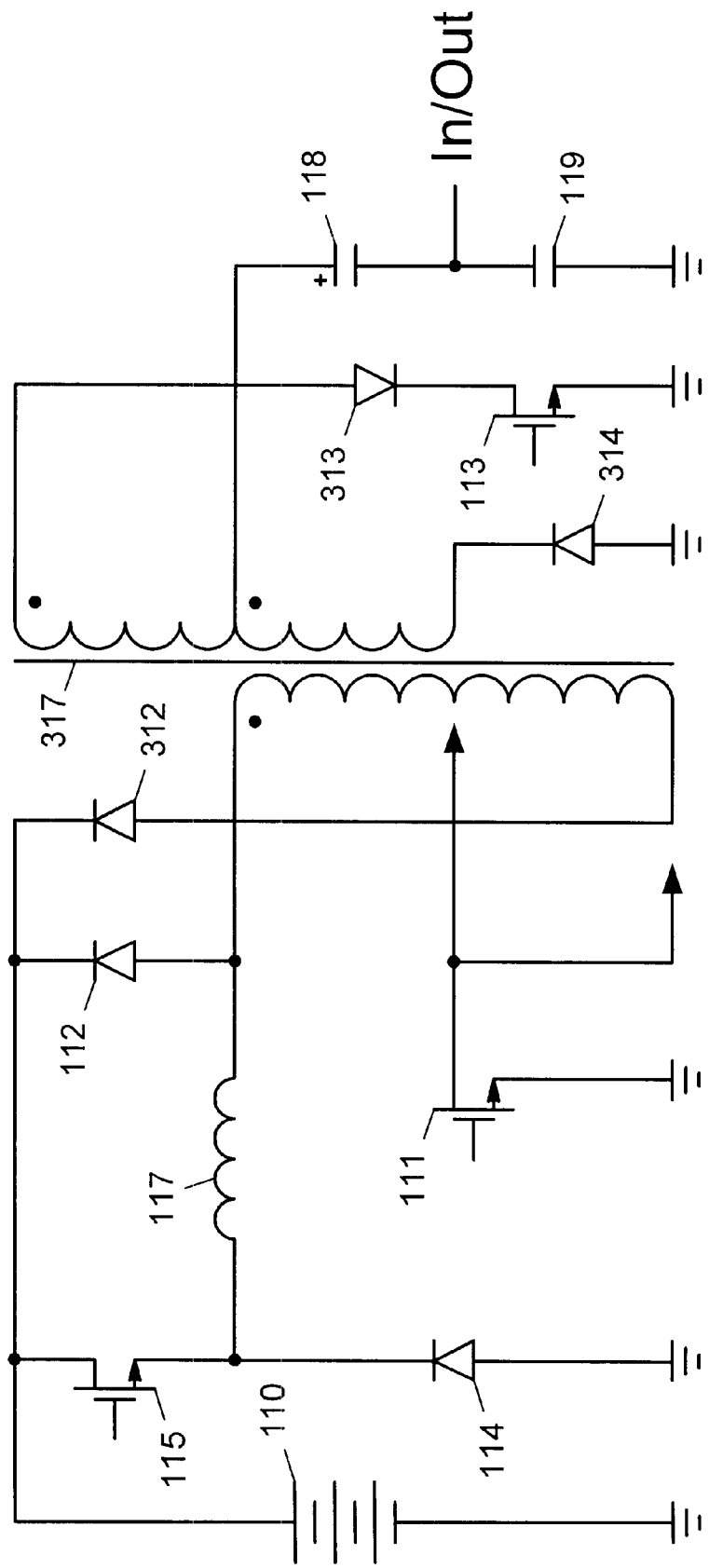
FIG. 11 is the preferred embodiment of a bi-directional $I^2PS$ with a forward transformer and an input inductor.

FIG. 11 is the preferred embodiment of a bi-directional I²PS with a forward transformer and an input inductor. In contrast to the I²PS of FIG. 10, voltages applied to the inductor 117 and the primary winding of the forward transformer 317 are limited to the battery voltage. Only two capacitors are used. Moreover, the inductor current is uni-directional. The voltage of the battery 110 is applied to the drain of the switch 115 and the cathodes of the diodes 112 and 312. The source of the switch 115 is tied to the cathode of the diode 114 and the inductor 117. One end of the primary winding of the transformer 317 is tied to the anode of the diode 112 and the inductor 117. The other end is tied to the drain of the switch 111 and the anode of the diode 312.

Alternatively, the drain of the switch 111 can be connected to a tap of the primary winding. This is marked in the drawing. A diode may be added between the battery 110 and the primary tap if an excessive voltage spike appears across the switch 111. Another diode can be added in series with the switch 111 if a negative voltage appears thereacross. The components 113, 118, 119, 313, 314 and the secondary winding of the transformer 317 are connected as the components 103, 108, 109, 303, 304 and the secondary winding of the transformer 307 of FIG. 10 respectively. In particular, there are fewer turns between the secondary tap and the diode 313 than between that tap and the diode 314. However, if the switch 111 is connected to the primary tap, the secondary tap can be centered. The capacitor 119 provides the output voltage of the I²PS. The battery 110, the sources of the switches 111, 113, the anodes of the diodes 114, 314 and the capacitor 119 are grounded.

The switches 111 and 115 turn on to increase the output voltage. The battery voltage is applied to the inductor 117, whereas the primary winding is effectively grounded. The respective turns ratio of the transformer 317 is chosen so that the corrective current is supplied even at positive peak of the output voltage. The diode 314 conducts the corrective current, wherein the secondary voltage is approximately equal to a sum of the voltages stored in the capacitors 118 and 119. Therefore, the primary voltage is limited to the sum multiplied by the respective turns ratio. Similarly, the corrective current is limited to the inductor current multiplied by that ratio. The primary and secondary currents of the transformer 317 are equal to the inductor and corrective currents respectively.

When the switches 111 and 115 are turned off, energy stored in the inductor 117 is fed back to the battery 110. The corrective current is immediately cut off, as the diode 314 is reverse polarized. Specifically, the diodes 114 and 312 take over the inductor and magnetizing currents respectively. The diode 112 conducts a difference between both currents. The battery voltage is applied across the inductor 117, wherein the inductor current decays to zero. By contrast, the primary winding is effectively shorted. Therefore, transformer reset is delayed until the inductor current drops to the level of the magnetizing current. Subsequently, the diode 313 protects the switch 113 if the output voltage is below a threshold.

The switch 113 selectively applies the corrective current to ground. It turns on to decrease the output voltage while the switches 111 and 115 are inactive. The corrective current is again proportional to the inductor current. Similarly, the primary voltage is proportional to the sum of the capacitor voltages. However, the respective turns ratio is larger since the switch 113 conducts the corrective current and the diode 314 is cut off. As a result, the primary voltage is greater than the battery voltage even when the output voltage reaches negative peak. The inductor current flows through the diodes 114, 312 and charges the battery 110. When the switch 113 turns off, the corrective current collapses to a negligible level. Specifically, the primary and secondary voltages reverse polarities. The diode 112 takes over the inductor current that decays to zero. The diode 314 takes over the corrective current that is reduced merely to the magnetizing current. Similarly, the switch 113 is energized to perform the battery charging while an AC voltage is applied across the capacitor 119. The I²PS operates as if to reduce the AC voltage.

Figure 12:
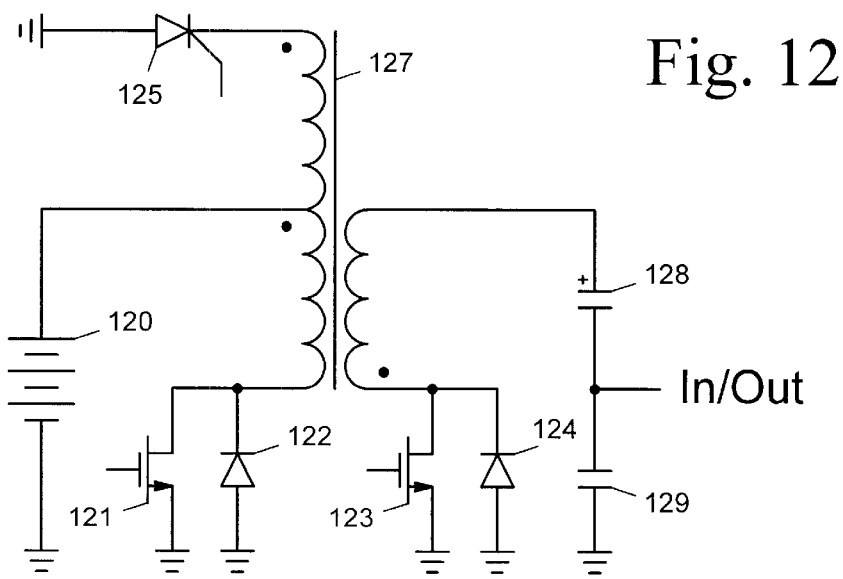
FIG. 12 is the preferred embodiment of a bi-directional $I^2PS$ with a flyback transformer.

FIG. 12 is the preferred embodiment of a bi-directional I²PS with a flyback transformer. In the previously disclosed I²PSs of FIGS. 10 and 11, the corrective current is occasionally reduced to the magnetizing current of a forward transformer. Although the latter current is negligible, the cutoff is less than perfect. By contrast, the instant I²PS can reduce the corrective current to zero at any time. The I²PS represents an enhanced version of the two-switch UPS of FIG. 1. The components 120 through 124, 128 and 129 are connected as the components 10 through 14, 18 and 19 of FIG. 1 respectively. However, the primary winding of the flyback transformer 127 is expanded. The battery 120 is connected to a primary tap. The additional end of the primary winding is tied to the cathode of the switch 125, a thyristor. The anode of the switch 125 is grounded.

If the switch 125 is inactive, the operation of the I²PS is identical to that of the FIG. 1 UPS. However, the later apparatus is incapable of instantaneously interrupting the corrective current without causing energy buildup. The expanded primary winding and the switch 125 prevent just that. Specifically, the switch 121 turns on to increase the output voltage. The switch 125 is nonconductive as the cathode voltage thereof is positive. The corrective current is zero since the switch 123 is turned off and the diode 124 is reverse biased. When the switch 121 turns off, the diode 124 applies the corrective current to the capacitors 128 and 129. The corrective current can be instantaneously interrupted by turning the switch 121 on again. However, this results in a buildup of energy stored in the transformer 127. The corrective current is even higher next time the switch 121 turns off.

The switch 125 is triggered to redirect energy flow caused by transformer reset. Specifically, the DC voltage of the capacitor 128 and the respective turns ratio of the transformer 127 are chosen so that the voltage at the cathode of the switch 125 is negative even when the output voltage is at negative peak. When the switch 125 turns on, the diode 124 is reverse biased and the corrective current is immediately interrupted. Energy stored in the transformer 127 is fed back to the battery 120. The switch 125 turns off automatically when the primary current drops below a thyristor holding current. The latter current is substantially equal to zero. Therefore, the switch 125 turns off automatically when the switch 121 turns on or when the transformer 127 is reset. A MOSFET in series with a diode can be substituted for the switch 125. The result is fully controllable switch 125 delivering a superior performance. The switch 125 is inactive during the reverse operation of the I²PS, including the battery charging.

Figure 13:
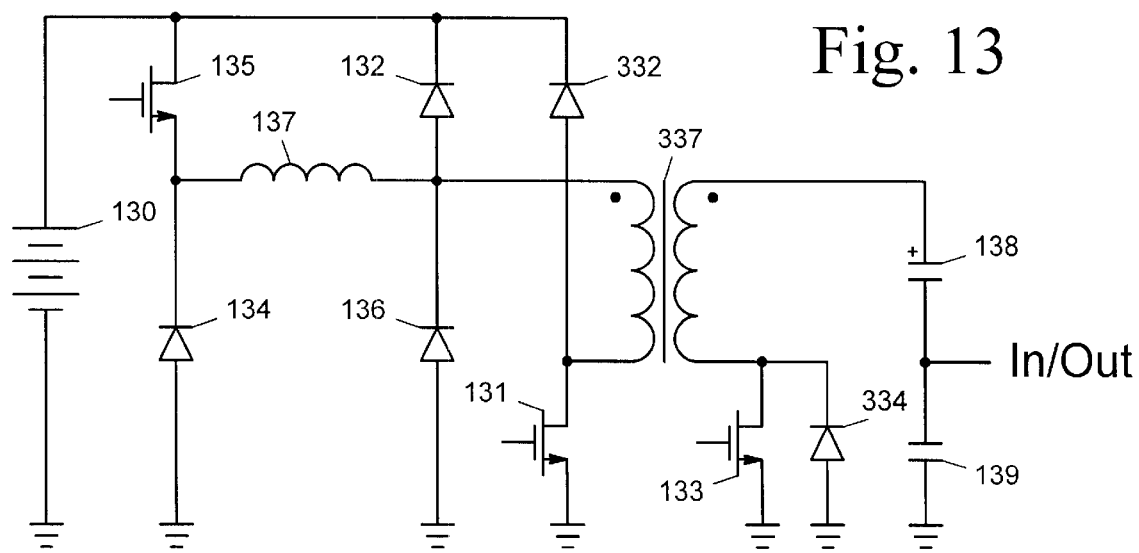
FIG. 13 is another embodiment of a bi-directional $I^2PS$ with a forward/flyback transformer and an input inductor.

FIG. 13 is another embodiment of a bi-directional I²PS with a forward/flyback transformer and an input inductor. In the I²PSs of FIGS. 10 and 11, the interruption of the corrective current is less than perfect. Similar to the FIG. 12 I²PS, the instant I²PS can interrupt the corrective current at any time. The I²PS is a cross between the embodiments of FIGS. 1 and 11. Accordingly, primary and secondary sides of the I²PS are structured like the respective sections of those embodiments. Specifically, the components 130 through 132, 134, 135, 137 and 332 are connected as the components 110 through 112, 114, 115, 117 and 312 of FIG. 11 respectively. However, the additional diode 136 has cathode connected to the components 132, 137 and 337. The anode of the diode 136 is grounded. The components 133, 138, 139 and 334 are connected as the components 13, 18, 19 and 14 of FIG. 1 respectively. The forward/flyback transformer 337 corresponds to the flyback transformer 17 of FIG. 1. The transformer 337 corresponds also to the forward transformer 317 of FIG. 11, whereas the primary and secondary windings have no taps.

The I²PS operates in forward and flyback modes like the I²PS of FIG. 11 and the UPS of FIG. 1 respectively. In particular, the inductor current is unidirectional. The switches 131 and 135 turn on to increase the output voltage. The respective turns ratio of the transformer 337 is chosen so that the corrective current is supplied even at positive peak of the output voltage. The diode 334 conducts the corrective current, wherein the secondary voltage is approximately equal to a sum of the voltages stored in the capacitors 138 and 139. Therefore, the primary voltage is limited to the sum multiplied by the turns ratio. Similarly, the corrective current is limited to the inductor current multiplied by the ratio. When the switches 131 and 135 turn off, the diode 334 is reverse polarized and the corrective current is immediately interrupted. The diodes 132 and 134 apply the battery voltage across the inductor 137. By contrast, the primary winding is effectively shorted through the diodes 132 and 332. Therefore, transformer reset is delayed until the inductor current drops to the level of the magnetizing current.

The switch 133 turns on to decrease the output voltage. The switches 131 and 135 are turned off. The sum of the capacitor voltages is applied across the secondary winding. The primary voltage is proportional to the sum and is thus smaller than the battery voltage. The primary winding is effectively disconnected, wherein the transformer 337 acts like an inductor. When the switch 133 turns off, the corrective current is immediately interrupted. The primary and secondary voltages reverse polarities. The inductor current can build up only when the switches 131 and 135 are turned on. Therefore, the inductor current may be still present during the flyback phase. The inductor and magnetizing currents flow through the diodes 134 and 332 respectively. The diode 132 or 136 conducts a difference between both currents.

The transformer 337 and/or the inductor 137 deliver energy to the battery 130. Specifically, if the magnetizing current is smaller than the inductor current, the battery voltage is applied across the inductor 137. The primary winding is effectively shorted and transformer reset is delayed. Conversely, if the magnetizing current is greater than the inductor current, the battery voltage is applied across the primary winding. The inductor current, if any, flows through the diodes 134 and 136. Finally, if both currents are even, the primary winding and the inductor 137 act like a single inductor with the battery voltage applied thereacross. The diodes 132 and 136 are cut off. Similarly, the switch 133 is energized to perform the battery charging while an AC voltage is applied across the capacitor 139. The I²PS operates as if to reduce the AC voltage. The inductor current is zero.

Figure 14:
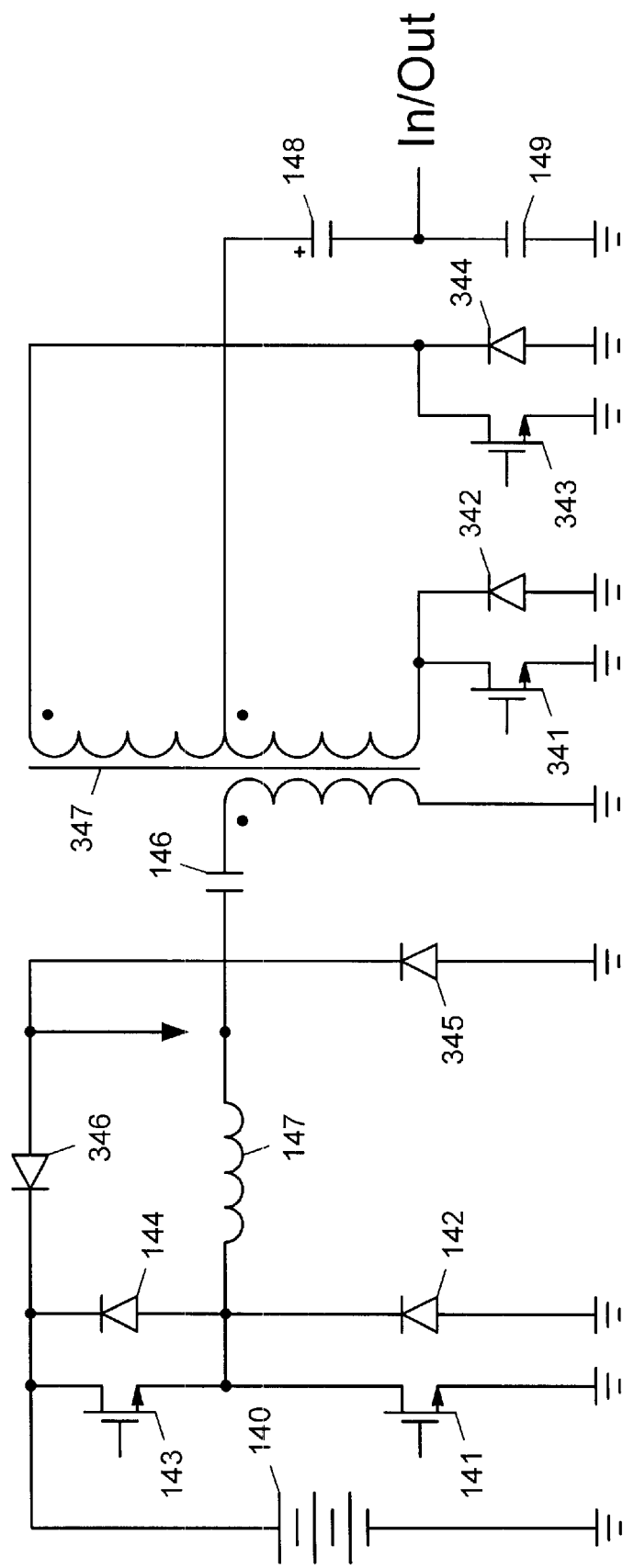
FIG. 14 is an embodiment of a UPS with half-bridge and push-pull converters.

FIG. 14 is an embodiment of a UPS with half-bridge and push-pull converters. The UPS implements a bi-directional half-bridge converter with current output and a conventional push-pull converter. The bi-directional half-bridge converter is depicted in FIG. 10 of the co-pending application titled "Switching Power Supplies Incorporating Power Factor Correction and/or Switching at Resonant Transition," filed on even date herewith. This converter is also shown in FIG. 5 of the co-pending application titled "Precision Switching Power Amplifier and Uninterruptible Power System," filed on even date herewith. However, only one pair of diodes is required. Other embodiments can be substituted for the bi-directional half-bridge converter. For example, the FIG. 12 I²PS of the latter disclosure can drive the transformer 347 rather than an output capacitor. Moreover, the instant UPS becomes a bi-directional I²PS. These modifications and changes would have been obvious to persons skilled in the art, based on this disclosure and the disclosure of the co-pending applications. In contrast to all embodiments disclosed hereinabove, the instant UPS employs no output inductor and yet is capable of continuously delivering energy to the output capacitor.

A supply voltage provided by the battery 140 is converted into the corrective current. The respective converter comprises an inductive block for attaining the corrective current and providing a return voltage. The block comprises the inductor 147 and the forward transformer 347. The capacitor 146 is in series with the block. It simulates a negative supply voltage so that voltages of both polarities are sequentially applied across the primary winding. The diodes 142 and 144 limit the return voltage provided by the inductor 147. The primary voltage can be limited in the same fashion. The switches 141 and 143 selectively apply the battery voltage to the inductive block. The transformer 347 provides the corrective current in response to the inductor current. The switches 341 and 343 selectively apply the corrective current to ground and thus to the capacitors 148 and 149. Similarly, the diodes 342 and 344 rectify and apply the corrective current to ground and thus to the capacitors 148 and 149.

Specifically, the battery voltage is applied to the drain of the switch 143 and the cathodes of the diodes 144, 346. One end of the inductor 147 is connected to the drain of the switch 141, the source of the switch 143, the cathode of the diode 142 and the anode of the diode 144. The other end is connected to the cathode of the diode 345, the anode of the diode 346 and the capacitor 146. The diodes 345 and 346 are optional as marked in the drawing. The capacitor 146 is in series with the primary winding of the transformer 347. The capacitor 146 stores a second DC voltage in response to the primary current and hence the inductor current. The second DC voltage is approximately equal to one half the battery voltage. One end of the secondary winding is connected to the drain of the switch 341 and the cathode of the diode 342. The other end is connected to the drain of the switch 343 and the cathode of the diode 344. The capacitor 148 is tied to a secondary center tap and in series with the capacitor 149. The output voltage appears thereacross. The battery 140, the sources of the switches 141, 341, 343, the anodes of the diodes 142, 342, 344, 345, the capacitor 149 and the primary winding are grounded.

The switch 143 turns on to increase the inductor current and charge the capacitor 146. The switch 141 is turned off. The battery voltage is applied to the inductor 147. Conversely, the switch 141 turns on to reverse polarity of the inductor current and discharge the capacitor 146. The switch 143 is turned off. The inductor 147 is effectively grounded. The turns ratio of the transformer 347 is chosen so that the diode 342 or 344 conducts the corrective current even when the output voltage is at positive peak. These diodes limit also the secondary voltage to a sum of the voltages stored in the capacitors 148 and 149. Accordingly, the primary voltage is proportional to the sum. Similarly, the corrective current is equal to the inductor current multiplied by the turns ratio. When the switch 141 or 143 turns off, the respective diode 144 or 142 takes over the inductor current. The diode 342 or 344 continues to conduct the corrective current. The switches 141 and 143 are energized alternately to continuously increase the output voltage.

Similarly, the switches 341 and 343 are energized alternately to continuously decrease the output voltage. Moreover, the switches 141 and 143 are switched concurrently as to maintain the second DC voltage of the capacitor 146. Specifically, the switch 341 turns on to enforce positive primary voltage. The switch 141 turns on simultaneously, wherein the inductor 147 is effectively grounded. The sum of the capacitor voltages is applied across the respective half of the secondary winding. The primary voltage is approximately equal to the sum multiplied by the turns ratio. A sum of the primary voltage and the second DC voltage is applied across the inductor 147. The inductor current builds up and discharges the capacitor 146. The switch 141 turns off first, whereas inductor current continues to discharge the capacitor 146. Moreover, the diode 144 delivers energy stored in the inductor 147 to the battery 140.

The remaining switches 143, 341 and 343 can change states before the inductor current drops to zero. Eventually, the inductor current flows in the opposite direction and recharges the capacitor 146. The primary voltage is positive or negative when the switch 341 or 343 is turned on respectively. Therefore, the switches 341 and 343 enforce polarity of the primary voltage regardless of states of the switches 141 and 143. Conversely, the switches 141 and 143 set direction of the corrective current regardless of states of the switches 341 and 343. A voltage at the juncture of the capacitor 146 and the inductor 147 is positive and smaller than the battery voltage. The optional diodes 345 and 346 limit spikes and minimize ringing appearing across the primary winding. The battery charging is performed when an AC voltage is applied across the capacitor 149. The UPS operates as if to reduce the AC voltage. However, the switch 143 is inactive. The second DC voltage is reduced. The capacitor 146 recharges via the diode 142 at positive peaks of the AC voltage while the switch 343 enforces negative primary voltage.

Figure 15:
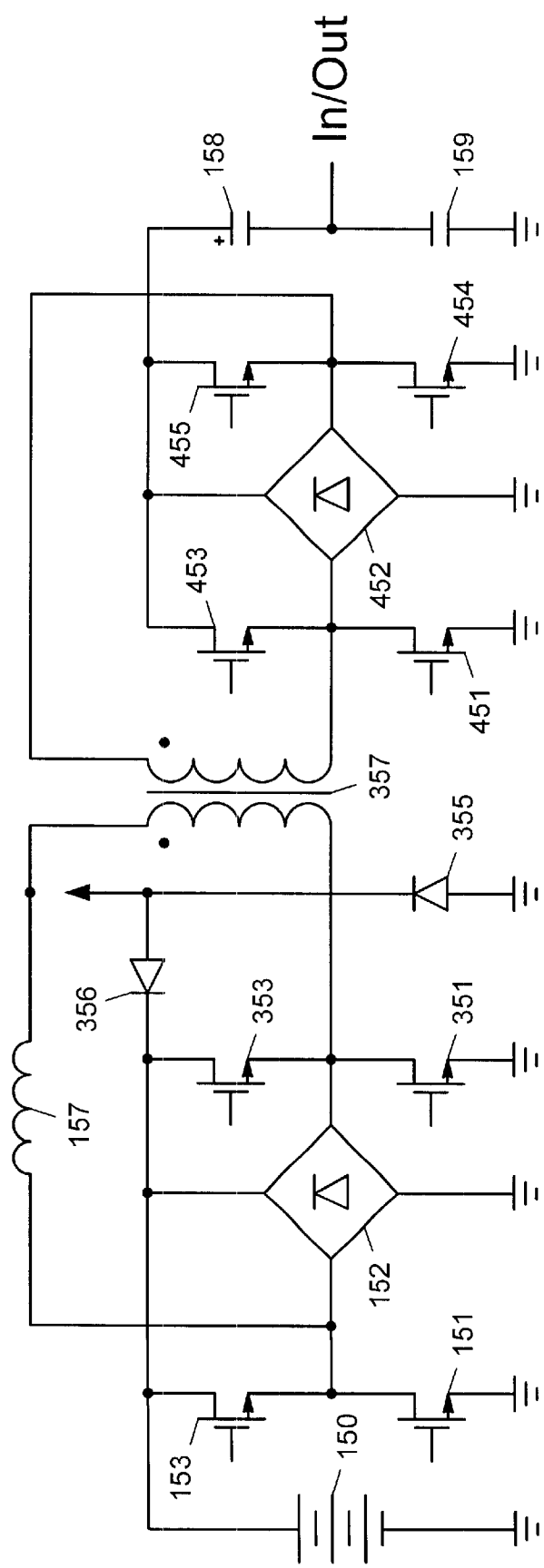
FIG. 15 is an embodiment of a UPS with a pair of full-bridge converters.

FIG. 15 is an embodiment of a UPS with a pair of full-bridge converters. The UPS implements a bi-directional full-bridge converter with current output and a conventional full-bridge converter. With reference to the FIG. 14 UPS, the bi-directional full-bridge converter eliminates the primary capacitor and effectively doubles the battery voltage. The bi-directional full-bridge converter is depicted in FIG. 11 of the co-pending application titled "Switching Power Supplies Incorporating Power Factor Correction and/or Switching at Resonant Transition," filed on even date herewith. However, the supply voltage of the instant converter is fixed. By contrast, the supply voltage of the conventional full-bridge converter implemented in the instant UPS inherently varies in a wide range. Similar to the FIG. 14 UPS, the instant UPS lacks an output inductor but is capable of continuously delivering the corrective current.

The battery 150 provides a supply voltage that is applied to the drains of the switches 153, 353, a positive output of the diode bridge 152 and the cathode of the diode 356. One end of the inductor 157 is connected to the drain of the switch 151, the source of the switch 153 and one input of the bridge 152. The other end is connected to the cathode of the diode 355, the anode of the diode 356 and one end of the primary winding of the forward transformer 357. The diodes 355 and 356 are optional as marked in the drawing. The other end of the primary winding is tied to the drain of the switch 351, the source of the switch 353 and the other input of the bridge 152. Similarly, the capacitor 158 is connected to the drains of the switches 453, 455 and a positive output of the diode bridge 452. One end of the secondary winding is tied to the drain of the switch 451, the source of the switch 453 and one input of the bridge 452. The other end is tied to the drain of the switch 454, the source of the switch 455 and the other input of the bridge 452. The capacitor 159 is in series with the capacitor 158 and provides the output voltage of the UPS. The battery 150, the sources of the switches 151, 351, 451, 454, negative outputs of the bridges 152, 452, the anode of the diode 355 and the capacitor 159 are grounded.

The switches 153, 351 or 151, 353 turn on to increase the output voltage. In the former case, the battery voltage is applied to the inductor 157 and the primary winding is effectively grounded. In the latter case, the battery voltage is applied to the primary winding and the inductor 157 is effectively grounded. The turns ratio of the transformer 357 is chosen so that the bridge 452 conducts the corrective current even when the output voltage is at positive peak. Therefore, the bridge 452 limits the secondary voltage to a sum of the voltages stored in the capacitors 158 and 159. The inductor 157 limits the primary current. Accordingly, the primary voltage and the corrective current are also limited. The switches 451 and 453 through 455 each can be energized to take over the corrective current conducted by the respective parallel-coupled diode of the bridge 452. The switches 153, 351 and 151, 353 are energized alternately to continuously increase the output voltage.

Similarly, the switches 451, 455 and 453, 454 are energized alternately to continuously decrease the output voltage. This is accomplished without discharging the battery 150. The sum of the capacitor voltages is applied across the secondary winding. Furthermore, the switches 151 and 351 turn on simultaneously. The primary voltage, regardless of its polarity, is applied across the inductor 157. When the switches 151 and 351 turn off, the bridge 152 rectifies the inductor current that charges the battery 150. Preferably, the switches 451 and 453 through 455 change states when the inductor 157 is discharged. A dead time is necessary to prevent cross-conduction of the respective switches. The optional diodes 355 and 356 limit spikes and minimize ringing appearing across the primary winding. The battery charging is performed when an AC voltage is applied across the capacitor 159. The UPS operates as if to reduce the AC voltage.

Figure 16:
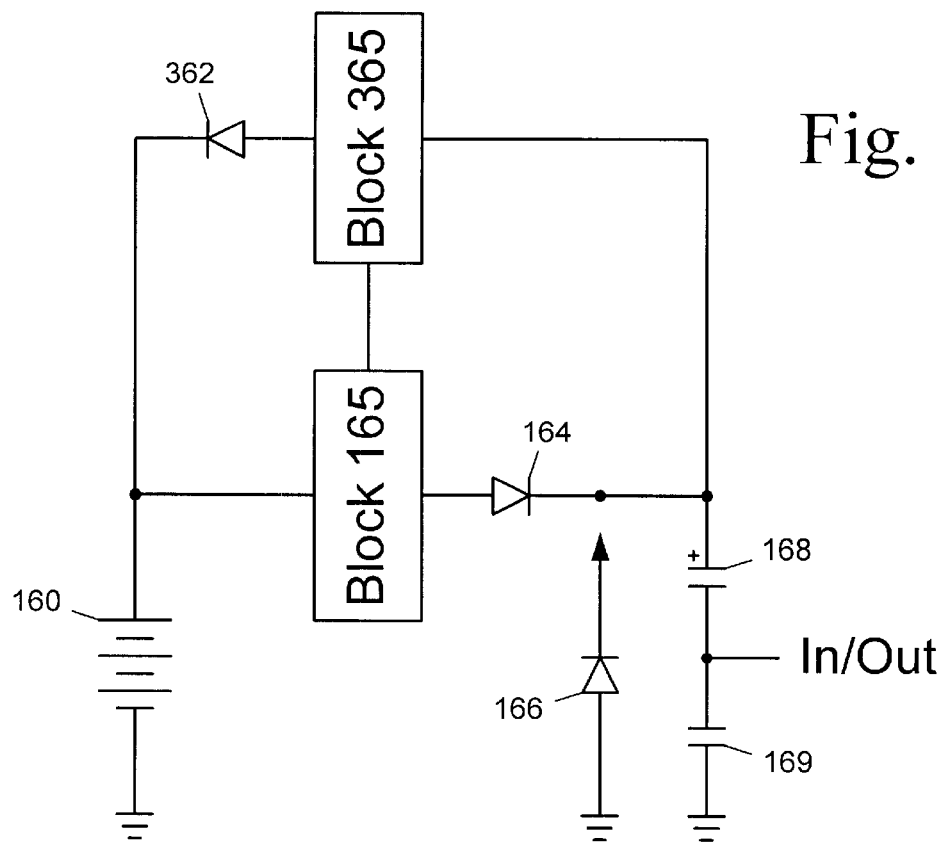
FIG. 16 is a block diagram of a UPS or a bi-directional $I^2PS$ with a pair of unidirectional embodiments.

FIG. 16 is a block diagram of a UPS or a bi-directional I²PS with a pair of unidirectional embodiments. The battery 160 represents a source means for providing at least one supply voltage. The battery voltage is applied to an input of the block 165 and the cathode of the diode 362. The capacitor 168 is connected to an input of the block 365 and the cathodes of the diodes 164 and 166. The diodes 164 and 362 are optional with the anodes connected to outputs of the blocks 165 and 365 respectively. The capacitor 168 stores a DC voltage. The capacitor 169 is in series with the capacitor 168 for providing the output voltage. A sum of the capacitor voltages is positive as in all embodiments disclosed herein.

The block 165 represents a converter for converting the battery voltage into one portion of the corrective current. The block 365 represents another converter for converting the sum of the capacitor voltages into a current that is fed back to the battery 160. Moreover, an input current of the converter 365 is the other portion of the corrective current. The output current of the converter 165 and the input current of the converter 365 flow in opposite directions, whereby bi-directional corrective current is established. Preferably, the corrective current is equal to one current while the other current is zero and vice versa. An additional connection between the blocks 165 and 365 is provided to prevent overlapping of the respective currents. The diode 166 is optional as marked in the drawing. The battery 160, the anode of the diode 166 and the capacitor 169 are grounded. Ground references of the blocks 165 and 365 are not shown for simplicity.

The sum of the capacitor voltages is positive even when the output voltage is at negative peak. Therefore, ordinary SPSs can be used as the blocks 165 and 365. In simplest case, the blocks 165 and 365 employ conventional boost and buck converters, in either order. Therefore, the boost converter includes the diode 164 or 362. The diode 362 or 164, respectively, connected to the buck converter is superfluous. In another example, the blocks 165 and 365 each implement conventional flyback converter. Each converter consists of a switch, an inductor and the respective diode 164 or 362. Moreover, it is necessary to reverse polarity of the battery voltage so that the sum of the capacitor voltages remains positive. Consequently, polarity of the diode 362 must be reversed.

The optional diode 168 limits the sum of the capacitor voltages. The diode 166 operates during a battery charging when an AC voltage is applied across the capacitor 169. The capacitor 168 is charged to negative peak of the AC voltage through the diode 166. The block 165 and/or 365 can already implement a diode that is equivalent to the diode 166. For example, the diodes 164 and 166 are superfluous if the block 164 is the conventional buck converter. The capacitor 168 changes up through a diode and an inductor of that converter. A possible saturation of the inductor is unimportant. Moreover, the apparatus of FIG. 18 can implement the instant embodiment. The diode 166 is superfluous since an alternative method of changing the battery 160 is carried out.

Figure 17:
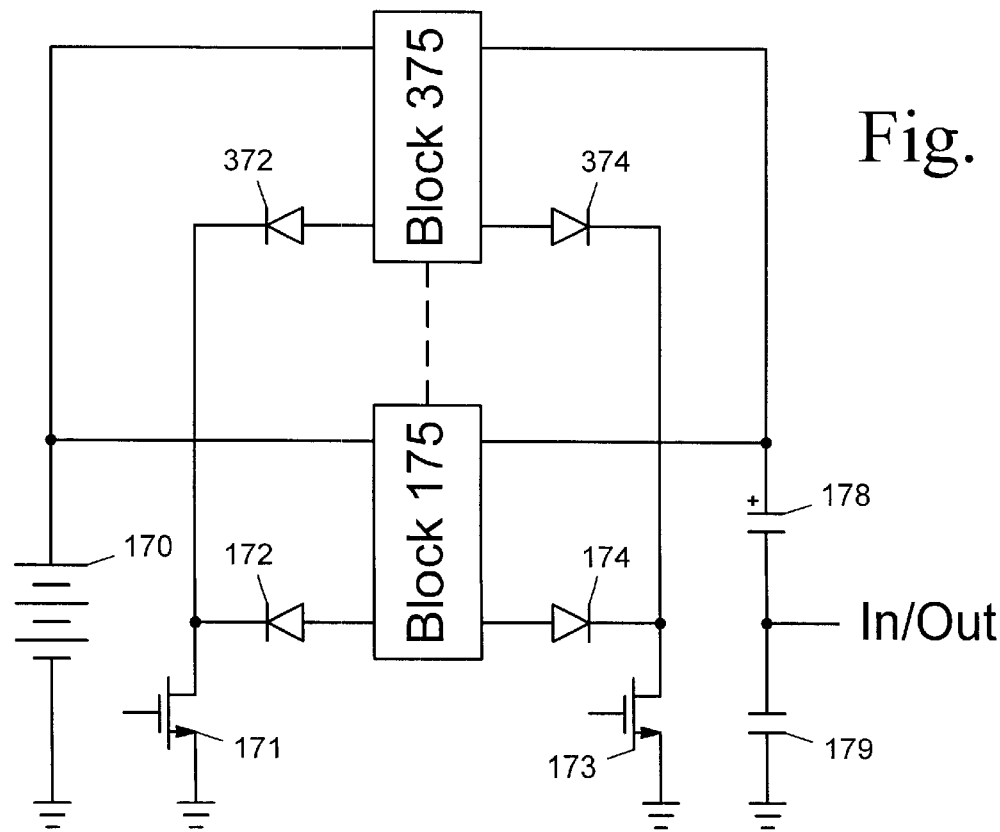
FIG. 17 illustrates a method of paralleling embodiments.

FIG. 17 illustrates a method of paralleling embodiments. This allows a dramatic increase in output power. With reference to a single embodiment, no additional switches are required. Moreover, inductive components carry reduced currents and are thus undersized. Power supply voltage or voltages, output capacitors and at least one switch are shared. Generally, any switch connected to power supply, ground or one of the output capacitors can be shared. The respective switch is replaced with a diode in each embodiment. The instant method refers to an unobvious way of paralleling embodiments. For example, output power of the FIG. 2 UPS can be doubled simply by using a pair of equal inductors and doubling current ratings of semiconductors.

The blocks 175 and 375 are supplied from the battery 170. The drains of the switches 171 and 173 are connected to the cathodes of the diodes 172, 372 and 174, 374 respectively. The anodes of the diodes 172, 174 and 372, 374 are tied to the blocks 175 and 375 respectively. Each block provides at least a portion of the corrective current that is applied to the capacitor 178. The capacitor 179 is in series therewith for providing the output voltage. The battery 170, the sources of the switches 171, 173 and the capacitor 179 are grounded. Ground references of the blocks 175 and 375 are not shown for simplicity. An additional connection between the blocks 175 and 375 can be used for fine-tuning. This is marked by the dashed line in the drawing.

The blocks 175 and 375 each include an inductive means and a pair of rectifying means. The inductive means provides a return voltage. One rectifying means limits the return voltage. The other rectifying means applies a sum of the voltages stored in the capacitors 178 and 179 to the inductive means. The return voltages of the blocks 175 and 375 can be limited to the same voltage, particularly the battery voltage. First and second switching means include the components 171, 172, 372 and 173, 174, 374 respectively. The first switching means selectively applies the battery voltage to the inductive means of both blocks 175 and 375. Similarly, the second switching means selectively applies the sum of the capacitor voltages to both inductive means.

In theory, any number of like embodiments can be paralleled. Moreover, connecting an SPA in parallel with a UPS would result in a UPS delivering an increased power. Paralleling two equal embodiments having a single supply voltage will be analyzed for simplicity. The embodiments shown in FIGS. 1 through 16 each can be paralleled. Therefore, a UPS can implement a pair of paralleled embodiments of FIGS. 1 through 4, 6 and 8 through 16. An SPA can implement the paralleled embodiments of FIGS. 5 and 7. In particular, the embodiments of FIGS. 1 and 4 through 15 each employ at least one pair of grounded switches for increasing and decreasing the output voltage. The blocks 175 and 375 are obtained by extracting shared components from original embodiments. Moreover, the diodes 172, 174 and/or 372, 374 may be already present in the blocks 175 and 375 respectively.

A UPS can implement the paralleled embodiments of FIG. 1. The components 170, 171, 173, 178 and 179 correspond to the components 10, 11, 13, 18 and 19 of FIG. 1 respectively. The blocks 175 and 375 each consist of merely three components, such as 12, 14 and 17 of FIG. 1. The switch 171 is connected through the diodes 172 and 372 to primary windings of both transformers, such as 17 of FIG. 1. Likewise, the switch 173 is connected through the diodes 174 and 374 to secondary windings of both transformers. Similar remarks apply when paralleling the embodiments of FIGS. 4 and 6. An SPA can implement the paralleled embodiments of FIG. 5. The components 170 and 171, 173, 178, 179 correspond to the power source and the components 51, 53, 58, 59 of FIG. 5 respectively. The blocks 175 and 375 each consist of the remaining components shown in FIG. 5. Moreover, a grounded capacitor, such as 56 of FIG. 5, can be shared. Four diodes, such as 52 and 257 of FIG. 5, from each block remain connected to that shared capacitor. The diodes 172 and 372 are superfluous.

An SPA can implement the paralleled embodiments of FIG. 7. The components 170 and 171, 173, 178, 179 correspond to the power source and the components 71, 73, 78, 79 of FIG. 7 respectively. The blocks 175 and 375 each consist of the remaining components shown in FIG. 7. Moreover, all switches can be shared. The drain of an additional switch, such as 75 of FIG. 7, is grounded. A pair of additional diodes has anodes connected to the source of that switch. A cathode of one additional diode is connected to a diode and a capacitor, such as 72 and 76 of FIG. 7 respectively, from the block 175. A cathode of the other additional diode is connected to the counterparts of the block 375. In the FIG. 7 embodiment, the capacitor 76 is in series with the components 72 and 75. The order of the series connection can be reversed. Therefore, that capacitor can be grounded and shared when the embodiments are paralleled. No additional diodes are necessary. Similar remarks apply to the paralleled embodiments of FIGS. 8 through 10 and 12. Moreover, in the paralleled embodiments of FIGS. 9 and 10, the diodes 172, 174, 372 and 374 are superfluous. In the paralleled embodiments of FIG. 12, the thyristor 125 can be shared.

The embodiments of FIGS. 2, 3, 11 and 13 through 15 each employ at least one ungrounded switch. A UPS can implement the paralleled embodiments of FIG. 2. The components 170, 171, 173, 178 and 179 correspond to the components 20, 23, 21, 28 and 29 of FIG. 2 respectively. However, the components 171 through 173, 178 and 372 are rearranged. The battery voltage is applied to the drain of the switch 171. The anodes of the diodes 172 and 372 are connected to the source of the switch 171. The source of the switch 173 is connected to the capacitor 178 whose polarity is reversed. The blocks 175 and 375 each consist of merely three components, such as 22, 24 and 27 of FIG. 2. The cathode of the diode 172 and the anode of the diode 174 are connected to a grounded inductor, such as 27 of FIG. 2, in the block 175. Likewise, the diodes 372 and 374 are connected to the other inductor in the block 375. Similar remarks apply to the paralleled embodiments of FIG. 3, whereas the respective inductors are tied to the capacitor 178. A UPS can implement the paralleled embodiments of FIGS. 11 and 13 through 15. All switches can be shared. One electrode of each switch remains connected to the battery, ground or, as in the FIG. 15 UPS, to the capacitor 148. The other electrode is connected through a pair of diodes to the respective inductive components in the blocks 175 and 375. In the paralleled embodiments of FIG. 11, the diodes 174 and 374 are superfluous.

The blocks 175 and 375 are inherently synchronized. The diodes 172, 372 or 174, 374 conduct only when the switch 171 or 173 is turned on respectively. However, differences in complementary components of the blocks 175 and 375 result in uneven currents conducted by the diodes 172, 372 or 174, 374. In particular, rates of charging and discharging inductive components in the blocks 175 and 375 are uneven. A portion of a supply current that the battery 170 delivers to one of the blocks can build up. Furthermore, portions of the corrective current delivered by the blocks 175 and 375 can flow in opposite directions. In order to prevent these conditions, the switches 171 and 173 can close after a delay. The additional connection between the block 175 and 375 allows fine-tuning.

Sharing all switches in the paralleled embodiments may not always be most beneficial. Any shared switch conducts a combined current deriving from both blocks 175 and 375. Employment of two switches having reduced current ratings may be more advantageous. Therefore, only the switch 171 or 173 and the respective diodes 172, 372 or 174, 374 can be used. For example, a UPS can implement the paralleled embodiments of FIG. 1. If the switch 171 is unused, the blocks 175 and 375 each consist of four components, such as 11, 12, 14 and 17 of FIG. 1. If the switch 173 is unused, the blocks 175 and 375 each consist of four components, such as 12 through 14 and 17 of FIG. 1. Preferably, both switches used in the blocks 175 and 375 are energized simultaneously.

FIG. 18 is a block diagram of a UPS or a bi-directional I²PS with a relay incorporating transfer switch and allowing sinusoidal charging current. The block 185 represents each of the embodiments shown in FIGS. 1 through 4, 6 and 8 through 17. The output capacitors 188 and 189 are shown within the block 185 to more clearly point out pertinent features. The embodiments of FIGS. 1, 6, 8 through 15 and possibly 16, 17 each employ at least one transformer providing galvanic isolation. Therefore, the battery 180 may be tied to a separate ground reference. The corrective current of the block 185 is applied to the series-coupled capacitors 188 and 189. The relay comprises the switches 181 and 183 that are mechanically coupled, as marked in the drawing.

Moreover, the relay incorporates the transfer switch for selecting the energy source. For example, the transfer switch is used in a stand-by UPS. This type of UPS is most cost-effective and ubiquitous. The battery 180 supplies the block 185. However, energy delivered thereto can also derive from the load or line.

Specifically, a positive output of the diode bridge 182 is connected to the capacitor 188. One selectable terminal of the switch 181 is tied to an input of the bridge 182. The other selectable terminal is tied to the resistor 186 and the capacitors 188, 189. The common terminal of the switch 181 is at ground potential. The output and line voltages are referenced thereto. However, this ground reference is incompatible with the ground reference of the embodiments shown in FIGS. 1 through 4, 6 and 8 through 17. One selectable terminal of the switch 183, a negative output of the bridge 182, the resistor 186 and the capacitor 189 are connected to the latter ground reference. The line voltage is applied to the other selectable terminal of the switch 183. The other input of the bridge 182 and the common terminal of the switch 183 are connected to the output of the apparatus. If the block 185 provides for line isolation, the battery 180 can be connected to either ground reference.

The relay selectively applies the line voltage to the bridge 182. The bridge 182 rectifies the line voltage and provides a sum of the voltages stored in the capacitors 188 and 189. An inductive component of the block 185 is coupled to the capacitor 188 or 189. Specifically, the relay directs flow of energy in response to amplitude of the line voltage. The relay is activated when the battery 180 and the capacitor 188 are fully charged, and amplitude of the line voltage is unsatisfactory. The result is depicted in the drawing. The switches 181 and 183 are positioned so that the block 185 delivers energy to the load. The block 185 produces the output voltage that appears across the capacitor 189.

The relay is switched when amplitude of the line voltage is adequate. The switches 181 and 183 apply the line voltage across the bridge 182 and to the output of the apparatus. The bridge 182 provides the sum of the capacitor voltages. The rectified voltage is applied across the series-coupled capacitors 188 and 189. As a result, inrush current is relatively small. Moreover, the sum reaches positive peak of the rectified voltage. The block 185 employs at least one switch for applying the sum to one or two inductive components. The respective switch or switches are energized to reverse energy flow and charge the battery 180. Accordingly, the block 185 produces a unidirectional charging current during the reverse operation. A portion of the charging current flows through the capacitors 188 and 189. The result may be a sinusoidal current drawn from line via the bridge 182.

The resistor 186 simulates a minimum load of the block 185. The resistor 186 has a large value, whereby its power loss is negligible. During the battery charging, the DC voltage stored in the capacitor 188 is below the peak level of the line voltage. When the battery 180 is fully charged, the charging current drops to zero. The resistor 186 discharges the capacitor 189 that holds a residue voltage. The capacitor 188 can charge up to the peak level of the line voltage. However, that level may be still below a level desired for the forward operation. The capacitor voltage is increased by energizing adequate switch or switches of the block 185. The corrective current is forced to flow in one direction through the resistor 186 while the bridge 182 is cut off. When the capacitor voltage reaches the desired level, the block 185 is ready for the forward operation. Similarly, the resistor 186 is effective during a startup of the block 185. The capacitor 188 is discharged, wherein the block 185 is incapable of delivering negative output voltage. The resistor 186 allows the initial charging of the capacitor 188. Furthermore, at least a minimal corrective current can flow in either direction when no load is used or when the load is asymmetric.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Unidirectional or bi-directional switching power apparatus converting at least one supply voltage into an AC output voltage comprising:
   a converter means for converting the supply voltage or voltages into a current, and including an inductive means for attaining the current;
   a first capacitive means for storing a DC voltage;
   a switching means for selectively applying the current to the first capacitive means;
   a rectifying means for rectifying and applying the current to the first capacitive means; and
   a second capacitive means coupled in series with the first capacitive means for providing the AC output voltage.

2. Switching power apparatus of claim 1 wherein the converter means includes a second switching means for selectively applying the supply voltage or voltages to the inductive means.

3. Switching power apparatus of claim 1 wherein the inductive means provides a return voltage, and
   further wherein the converter means includes a second rectifying means for limiting the return voltage.

4. Switching power apparatus of claim 3 wherein the converter means includes a third capacitive means for storing a second DC voltage,
   further wherein the second rectifying means limits the return voltage substantially to the second DC voltage, and
   still further wherein the converter means converts the supply voltage or voltages and the second DC voltage into the current.

5. Switching power apparatus of claim 4 wherein the converter means includes a second switching means for selectively applying the supply voltage or voltages and the second DC voltage to the inductive means.

6. Switching power apparatus of claim 3 wherein first said inductive means includes:
   a second inductive means for attaining the current; and
   a third inductive means for providing the return voltage in response to the current.

7. Switching power apparatus of claim 1 wherein first said inductive means includes:
   a second inductive means for attaining a second current; and
   a third inductive means for providing first said current in response to the second current.

8. Switching power apparatus of claim 1 wherein the converter means includes a third capacitive means coupled in series with the inductive means for storing a second DC voltage.

9. Switching power apparatus of claim 1 further including:
   a second converter means for converting the supply voltage or voltages into a second current, and including a second inductive means for attaining the second current; and a second rectifying means for rectifying and applying the second current to the first capacitive means.

10. Switching power apparatus of claim 9 wherein the second inductive means provides a second return voltage, and further wherein the second converter means includes a third rectifying means for limiting the second return voltage.

11. Switching power apparatus of claim 9 further including a second switching means for selectively applying the supply voltage or voltages to first said inductive means and the second inductive means, wherein the second converter means includes a third switching means for selectively applying the second current to the first capacitive means.

12. Switching power apparatus of claim 9 wherein the second converter means includes a second switching means for selectively applying the supply voltage or voltages to the second inductive means, and further wherein first said switching means selectively applies first said current and the second current to the first capacitive means.

13. Switching power apparatus of claim 9 further including a second switching means for selectively applying the supply voltage or voltages to first said inductive means and the second inductive means, and further wherein first said switching means selectively applies first said current and the second current to the first capacitive means.

14. Switching power apparatus of claim 1 further including:

a second rectifying means for rectifying a second AC voltage and providing a sum of the DC voltage and the AC output voltage; and a second switching means for selectively applying the second AC voltage to the second rectifying means.

15. Unidirectional or bi-directional switching power apparatus converting a supply voltage or voltages into an AC output voltage comprising:

a converter means for converting the supply voltage or voltages into a binary voltage;

an inductive means for providing a return voltage in response to the binary voltage;

a rectifying means for limiting the return voltage;

a first capacitive means for storing a DC voltage;

a switching means for selectively applying a sum of the DC voltage and the AC output voltage to the inductive means; and a second capacitive means coupled in series with the first capacitive means for providing the AC output voltage.

16. Switching power apparatus of claim 15 wherein the converter means includes:

a second inductive means for attaining a current;

a second switching means for selectively applying the supply voltage or voltages to the second inductive means; and a second rectifying means for rectifying the current and providing the binary voltage.

17. Switching power apparatus of claim 15 further including:

a second rectifying means for rectifying a second AC voltage and providing the sum; and a second switching means for selectively applying the second AC voltage to the second rectifying means.

18. Unidirectional or bi-directional switching power apparatus converting at least one supply voltage into an AC output voltage comprising:

a source means for providing the supply voltage or voltages;

a first capacitive means for storing a DC voltage;

a first converter means for converting the supply voltage or voltages into a first current applied to the first capacitive means;

a second converter means for converting a sum of the DC voltage and the AC output voltage into a second current applied to the source means; and a second capacitive means coupled in series with the first capacitive means for providing the AC output voltage.

19. Switching power apparatus of claim 18 further including a rectifying means for limiting the sum.

20. Switching power apparatus of claim 18 further including:

a rectifying means for rectifying a second AC voltage and providing the sum; and a switching means for selectively applying the second AC voltage to the rectifying means.

* * * * *